United States Patent
Ballepu

(10) Patent No.: US 12,039,563 B2
(45) Date of Patent: *Jul. 16, 2024

(54) SYSTEM AND METHOD FOR PROVIDING ENHANCED REWARDS TO CUSTOMERS

(71) Applicant: Capital One Services, LLC, McLean, VA (US)

(72) Inventor: Sharad Ballepu, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/172,869

(22) Filed: Feb. 10, 2021

(65) Prior Publication Data

US 2021/0166259 A1 Jun. 3, 2021

Related U.S. Application Data

(63) Continuation of application No. 16/032,819, filed on Jul. 11, 2018, now Pat. No. 10,943,249, which is a
(Continued)

(51) Int. Cl.
*G06Q 30/00* (2023.01)
*G06F 3/04817* (2022.01)
*G06Q 30/0226* (2023.01)

(52) U.S. Cl.
CPC ..... *G06Q 30/0226* (2013.01); *G06F 3/04817* (2013.01)

(58) Field of Classification Search
None
See application file for complete search history.

(56) References Cited

U.S. PATENT DOCUMENTS

| 7,716,140 B1 * | 5/2010 | Nielsen | H04L 67/306 726/21 |
| 7,949,611 B1 * | 5/2011 | Nielsen | G06Q 50/01 726/4 |

(Continued)

FOREIGN PATENT DOCUMENTS

| JP | 2016118948 A * | 6/2016 | G06F 13/00 |
| JP | 2017111782 A * | 6/2017 | H04L 67/02 |
| JP | 2017187995 A * | 10/2017 | G06F 13/00 |

OTHER PUBLICATIONS

Rampton, John. Importance of a Trust Seal on Your eCommerce Website. (Dec. 16, 2014). Retreived online Mar. 30, 2018. https://www.forbes.com/sites/johnrampton/2014/12/16/importance-of-a-trust-seal-on-your-ecommerce-website/#9f78a7f68029 (Year: 2014).*

(Continued)

*Primary Examiner* — James A Reagan
(74) *Attorney, Agent, or Firm* — Perkins Coie LLP

(57) ABSTRACT

Systems and methods for providing rewards to a user are provided. Providing rewards to the user may include receiving transaction data associated with a user's purchase, determining a merchant and a category associated with the transaction data, and assigning the transaction data to a merchant icon or a badge icon in a graphical user interface. The merchant icon or the badge icon may comprise a progress bar that indicates the user's progress in reaching a milestone associated with the icon. Based on the transaction data, a number of loyalty points of a number of transaction points may be assigned to the merchant icon or the badge icon, respectively. Further, based on whether a total number of loyalty points exceeds a first threshold or a total number of transaction points exceeds a second threshold, a reward may be generated to the user when the first or second threshold is exceeded.

20 Claims, 11 Drawing Sheets

Related U.S. Application Data continuation of application No. 16/002,289, filed on Jun. 7, 2018, now Pat. No. 10,325,277.

(56) References Cited

U.S. PATENT DOCUMENTS

| | | | | |
|---|---|---|---|---|
| 8,429,090 | B1* | 4/2013 | Nielsen | G06F 21/6245 |
| | | | | 705/319 |
| 8,489,516 | B1* | 7/2013 | Nielsen | H04L 67/306 |
| | | | | 705/319 |
| 8,775,326 | B1* | 7/2014 | Nielsen | G06F 21/6245 |
| | | | | 705/319 |
| 10,325,277 | B1* | 6/2019 | Ballepu | G06F 3/04817 |
| 10,504,126 | B2* | 12/2019 | Kulkarni | H04M 15/8011 |
| 10,943,249 | B2* | 3/2021 | Ballepu | G06Q 30/0226 |
| 2003/0220834 | A1* | 11/2003 | Leung | G06Q 30/0224 |
| | | | | 705/14.25 |
| 2013/0073473 | A1* | 3/2013 | Heath | G06Q 30/06 |
| | | | | 705/319 |
| 2013/0325548 | A1* | 12/2013 | Kulkarni | H04M 15/8011 |
| | | | | 705/7.29 |
| 2013/0325587 | A1* | 12/2013 | Kothari | G06Q 30/0243 |
| | | | | 705/14.42 |
| 2013/0325608 | A1* | 12/2013 | Kulkarni | H04M 15/83 |
| | | | | 705/14.53 |
| 2013/0325667 | A1* | 12/2013 | Satyavolu | G06Q 30/0629 |
| | | | | 705/26.64 |
| 2013/0325680 | A1* | 12/2013 | Satyavolu | H04M 15/58 |
| | | | | 705/35 |
| 2013/0325681 | A1* | 12/2013 | Somashekar | H04M 15/851 |
| | | | | 705/35 |
| 2013/0346302 | A1* | 12/2013 | Purves | G06Q 20/108 |
| | | | | 705/40 |
| 2014/0074605 | A1* | 3/2014 | Sanchez | G06Q 20/40 |
| | | | | 705/14.53 |
| 2014/0101197 | A1* | 4/2014 | Charytoniuk | G06F 16/9535 |
| | | | | 707/770 |
| 2014/0172560 | A1* | 6/2014 | Satyavolu | H04M 15/8044 |
| | | | | 705/14.53 |
| 2014/0344248 | A1* | 11/2014 | Stoop | G06F 16/5866 |
| | | | | 707/722 |
| 2015/0170175 | A1* | 6/2015 | Zhang | H04M 15/851 |
| | | | | 705/7.33 |
| 2015/0220951 | A1* | 8/2015 | Kurapati | G06Q 30/0204 |
| | | | | 705/7.33 |
| 2015/0220999 | A1* | 8/2015 | Thornton | H04M 15/805 |
| | | | | 705/14.66 |
| 2015/0348083 | A1* | 12/2015 | Brill | G06Q 20/386 |
| | | | | 705/14.23 |
| 2016/0012465 | A1* | 1/2016 | Sharp | G06Q 20/18 |
| | | | | 705/14.17 |
| 2016/0086222 | A1* | 3/2016 | Kurapati | G06Q 40/08 |
| | | | | 705/14.53 |
| 2019/0130429 | A1* | 5/2019 | Roy | G06Q 30/0207 |
| 2019/0378157 | A1* | 12/2019 | Ballepu | G06F 3/04817 |

OTHER PUBLICATIONS

Terry M. McGovern. Academic Digital Badges: Industry, Employment, and Prospects. (2019) Retrieved online Oct. 20, 2020. https://search.proquest.com/openview/d754880a6a04e93a4710dee2b02e730b/1?pq-origsite=gscholar&cbl=18750&diss=y (Year: 2019).*

Gabe Zichermann et al. "Gamification by Design Implementing Game Mechanics in Web and Mobile Apps." (2011). Retrieved online Jan. 26, 2023. http://storage.libre.life/Gamification_by_Design.pdf (Year: 2011).*

* cited by examiner

SYSTEM AND METHOD FOR PROVIDING ENHANCED REWARDS TO CUSTOMERS

CROSS-REFERENCE TO RELATED APPLICATIONS

This application is a continuation of U.S. patent application Ser. No. 16/032,819, filed Jul. 11, 2018, which is a continuation of U.S. patent application Ser. No. 16/002,289, filed Jun. 7, 2018. The content of the foregoing applications is incorporated herein in its entirety by reference.

TECHNICAL FIELD

The exemplary embodiments of the present disclosure relate to systems and methods for providing enhanced rewards to customers.

BACKGROUND

Currently, users may earn rewards in the form of miles, points, discounts, cashback, and gift cards. A user may have a plurality of rewards accounts, each with a different merchant, and each account may have different rules associated with it. For example, each reward program and/or software systems may only be associated with one merchant. As such, if a user signs up multiple reward programs at various merchant, the user would need to monitor different reward program software systems for each merchant. Therefore, it may be difficult for the user to keep track of the plurality of rewards accounts for various merchants.

Furthermore, existing rewards programs do not provide rich user interaction to keep the user engaged and motivated to earn rewards. Many users using existing rewards programs tend to be indifferent towards the rewards they've accumulated. In addition, with existing rewards programs, users are generally limited to viewing their own accumulated rewards. For example, users may not be able to view other users' accumulated rewards when they access their accounts page. Therefore, existing rewards programs have no useful and creative way to allow users to interact with rewards programs, interact with other users on the rewards programs, and track not only their progress in earning rewards, but other users' progress in earning rewards.

In view of the above deficiencies, there exists a need for improved systems and methods for providing enhanced rewards to users. Further, there exists a need for an improved rewards platform that encourages rich user interaction to keep the user engaged, informed, and motivated about their rewards. Additionally, there exists a need for improved systems and methods for providing enhanced rewards to users by incorporating social aspects to the rewards platform.

In the embodiments of the present disclosure, a user may be able to monitor multiple rewards accounts using a single software. In some embodiments, the user may be able to link a plurality of rewards account for various merchants with one profile so that the user can keep track of different rewards programs more easily. In addition, users may be able to interact with other users on the rewards platform, monitor other users' rewards on the rewards platform, and earn additional rewards for being a social user on the rewards platform. As such, a social platform may be provided on the software associated with the rewards programs in order to keep the user engaged and motivated about earning rewards. Such improved systems and methods have the potential to dramatically increase user engagement and loyalty, increase transactions and revenue for financial account providers, and increase retail sales at various merchants.

SUMMARY

In accordance with the present disclosure, a computer-implemented method of providing rewards to a user is provided. The method may comprise receiving transaction data associated with a purchase made by a user and determining, based on the transaction data, a merchant associated with the transaction data and a category associated with the transaction data. The method may further comprise assigning, in a graphical user interface, the transaction data to a merchant icon based on the merchant associated with the transaction and a badge icon based on the transaction category. The at least one of the merchant icon or the badge icon may further comprise a progress bar indicative of a progress of the user in reaching a milestone associated with at least one of the merchant icon or the badge icon. The method may further comprise assigning, in the graphical user interface, at least one of a number of loyalty points to the merchant icon or a number of transaction points to the badge icon based on the transaction data. Assigning at least one of the number of loyalty points or the number of transaction points may modify the progress bar associated with at least one of the merchant icon or the badge icon. The method may further comprise determining at least one of whether a total number of loyalty points associated with the merchant icon exceeds a first threshold or whether a total number of transaction points associated with the badge icon exceeds a second threshold. The method may further comprise generating a reward for the user when at least one of the first or second thresholds is exceeded.

In another embodiment, the method may further comprise receiving a history of a plurality of transactions associated with the user and generating the reward based on the transaction history. The transaction history may comprise at least one of a time, a date, a location, an amount spent, a merchant type, a merchant name, a total number of visits, or a frequency of visits associated with the transactions. In some aspects, the transaction data associated with the purchase may comprise at least one of a credit card number used, a transaction amount, a transaction date, a transaction location, a merchant name, a merchant type, or a merchant logo associated with the purchase.

In another embodiment, the merchant icon may comprise a first progress bar and the badge icon may comprise a second progress bar. In some aspects, at least one of the first or second progress bars may be color-coded based on a rule associated with at least one of the total number of loyalty points or the total number of transaction points. In some embodiments, at least one of the first or second progress bars may be displayed in a first color when at least one of the total number of loyalty points or the total number of transaction points reaches 25% of the first or second threshold. Further, at least one of the first or second progress bars may be displayed in a second color when at least one of the total number of loyalty points or the total number of transaction points reaches between 25% and 50% of the first or second threshold. Additionally, at least one of the first or second progress bars may be displayed in a third color when at least one of the total number of loyalty points or the total number of transaction points reaches between 50% and 75% of the first or second threshold. Lastly, at least one of the first or second progress bars may be displayed in a fourth color when at least one of the total number of loyalty points or the total number of transaction points reaches between 75% and 100% of the first or second threshold. The first threshold may be defined by the merchant, and the second threshold may be defined by a financial service provider.

In another embodiment, the graphical user interface may comprise a second badge icon associated with a total number of transactions associated with the user, and a third badge icon associated with a frequency of transactions associated with the user. In other embodiments, at least one of the merchant icon or the badge icon may be color-coded when at least one of the first or second thresholds is not exceeded, and at least one of the merchant icon or the badge icon may be grayed out when at least one of the first or second thresholds is exceeded.

According to another embodiment of the present disclosure, a system for providing rewards to a user is provided. The system may comprise at least one memory storing instructions and at least one processor executing the instructions to perform operation. The operations may comprise receiving transaction data associated with a purchase made by a user and determining, based on the transaction data, a merchant associated with the transaction data and a category associated with the transaction data. The operations may further comprise assigning, in a graphical user interface, the transaction data to a merchant icon based on the merchant associated with the transaction and a badge icon based on the transaction category. The at least one of the merchant icon or the badge icon may further comprise a progress bar indicative of a progress of the user in reaching a milestone associated with at least one of the merchant icon or the badge icon. The operations may further comprise assigning, in the graphical user interface, at least one of a number of loyalty points to the merchant icon or a number of transaction points to the badge icon based on the transaction data. Assigning at least one of the number of loyalty points or the number of transaction points may modify the progress bar associated with at least one of the merchant icon or the badge icon. The operations may further comprise determining at least one of whether a total number of loyalty points associated with the merchant icon exceeds a first threshold or whether a total number of transaction points associated with the badge icon exceeds a second threshold. The operations may further comprise generating a reward for the user when at least one of the first or second thresholds is exceeded.

In another embodiment, the operations may further comprise receiving a history of a plurality of transactions associated with the user and generating the reward based on the transaction history. The transaction history may comprise at least one of a time, a date, a location, an amount spent, a merchant type, a merchant name, a total number of visits, or a frequency of visits associated with the transactions. In some aspects, the transaction data associated with the purchase may comprise at least one of a credit card number used, a transaction amount, a transaction date, a transaction location, a merchant name, a merchant type, or a merchant logo associated with the purchase.

In another embodiment, the merchant icon may comprise a first progress bar and the badge icon may comprise a second progress bar. In some aspects, at least one of the first or second progress bars may be color-coded based on a rule associated with at least one of the total number of loyalty points or the total number of transaction points. In some embodiments, at least one of the first or second progress bars may be displayed in a first color when at least one of the total number of loyalty points or the total number of transaction points reaches 25% of the first or second threshold. Further, at least one of the first or second progress bars may be displayed in a second color when at least one of the total number of loyalty points or the total number of transaction points reaches between 25% and 50% of the first or second threshold. Additionally, at least one of the first or second progress bars may be displayed in a third color when at least one of the total number of loyalty points or the total number of transaction points reaches between 50% and 75% of the first or second threshold. Lastly, at least one of the first or second progress bars may be displayed in a fourth color when at least one of the total number of loyalty points or the total number of transaction points reaches between 75% and 100% of the first or second threshold. The first threshold may be defined by the merchant, and the second threshold may be defined by a financial service provider.

In another embodiment, the graphical user interface may comprise a second badge icon associated with a total number of transactions associated with the user, and a third badge icon associated with a frequency of transactions associated with the user. In other embodiments, at least one of the merchant icon or the badge icon may be color-coded when at least one of the first or second thresholds is not exceeded, and at least one of the merchant icon or the badge icon may be grayed out when at least one of the first or second thresholds is exceeded. In another embodiment, the transaction category may comprise at least one of food, travel, vacation, shopping, entertainment, health and fitness, total number of transactions, frequency of transactions, or a total number of referrals.

In yet another embodiment of the present disclosure, a system for providing rewards to a user is provided. The system may comprise at least one memory storing instructions and at least one processor executing the instructions to perform operation. The operations may comprise receiving transaction data associated with a purchase made by a user and determining, based on the transaction data, a merchant associated with the transaction data and a category associated with the transaction data. The transaction category may comprise at least one of food, travel, vacation, shopping, entertainment, health and fitness, total number of transactions, frequency of transactions, or a total number of referrals. The operations may further comprise assigning, in a graphical user interface, the transaction data to a merchant icon based on the merchant associated with the transaction and a badge icon based on the transaction category. The at least one of the merchant icon or the badge icon may further comprise a progress bar indicative of a progress of the user in reaching a milestone associated with at least one of the merchant icon or the badge icon. The operations may further comprise assigning, in the graphical user interface, at least one of a number of loyalty points to the merchant icon or a number of transaction points to the badge icon based on the transaction data. Assigning at least one of the number of loyalty points or the number of transaction points may modify the progress bar associated with at least one of the merchant icon or the badge icon. The operations may further comprise determining at least one of whether a total number of loyalty points associated with the merchant icon exceeds a first threshold or whether a total number of transaction points associated with the badge icon exceeds a second threshold. The operations may further comprise generating a reward for the user when at least one of the first or second thresholds is exceeded.

In another embodiment, a computer-implemented method of providing rewards to a user is provided. The method may comprise receiving, from a social networking site, encrypted data associated with a social media account of a user, and linking a loyalty profile of the first user to the social media account of the first user. The method may further comprise receiving transaction data associated with a purchase made by the first user, and determining, based on the transaction data, a merchant associated with the transaction data and a transaction category associated with the transaction data. The method may further comprise assigning, in a graphical user interface associated with the loyalty profile of the first user, the transaction data to a merchant icon, based on the merchant associated with the transaction, and a badge icon, based on the transaction category. The method may further comprise assigning, in the graphical user interface and based on the transaction data, at least one of a number of loyalty points to the merchant icon or a number of transaction points to the badge icon. The method may further comprise determining at least one of whether a total number of loyalty points associated with the merchant icon exceeds a first threshold or whether a total number of transaction points associated with the badge icon exceeds a second threshold. The method may further comprise generating a reward for the first user when at least one of the first or second thresholds is exceeded. The method may further comprise requesting, via the graphical user interface, permission from the first user to display, on the social media account of the first user, information associated with the generated reward, and transmitting the information to the social media account of the first user for display after permission is granted. The method may further comprise assigning, in the graphical user interface, additional loyalty points or transaction points to the merchant icon after the permission is granted.

In other embodiments, the at least one of the merchant icon or the badge icon may comprise a progress bar indicative of progress of the first user in reaching a milestone associated with at least one of the merchant icon or the badge icon. In some aspects, assigning at least one of the number of loyalty points or the number of transaction points may modify the progress bar.

In other embodiments, the method may further comprise requesting, via the graphical user interface, permission from the first user to display loyalty data associated with the loyalty profile of the first user on the social media account of the first user. After permission is granted, the method may further comprise displaying the loyalty data to the social media account of the first user. The loyalty data may comprise at least one of a number of badges unlocked, a list of badges unlocked, progress of the first user in unlocking badges, a total number of loyalty points accumulated, rewards received, rewards redeemed, or milestones met.

In some embodiments, generating the reward may further comprise receiving a history of a plurality of transactions associated with the first user, and generating the reward based on the transaction history. The transaction history may comprise at least one of a time, a date, a location, an amount spent, a merchant type, a merchant name, a total number of visits, or a frequency of visits associated with the transactions.

In other embodiments, the merchant icon may comprise a first progress bar and the badge icon may comprise a second progress bar. At least one of the first or second progress bars may be color-coded based on a rule associated with at least one of the total number of loyalty points or the total number of transaction points. In some embodiments, at least one of the first or second progress bars may be displayed in a first color when at least one of the total number of loyalty points or the total number of transaction points reaches 25% of the first or second threshold. Further, at least one of the first or second progress bars may be displayed in a second color when at least one of the total number of loyalty points or the total number of transaction points reaches between 25% and 50% of the first or second threshold. Additionally, at least one of the first or second progress bars may be displayed in a third color when at least one of the total number of loyalty points or the total number of transaction points reaches between 50% and 75% of the first or second threshold. Lastly, at least one of the first or second progress bars may be displayed in a fourth color when at least one of the total number of loyalty points or the total number of transaction points reaches between 75% and 100% of the first or second threshold. In some aspects, at least one of the merchant icon or the badge icon may be color-coded when at least one of the first or second thresholds is not exceeded, and may be grayed out when at least one of the first or second thresholds is exceeded.

In other embodiments, the method may further comprise providing a social dashboard on the graphical user interface. The dashboard may comprise loyalty data associated with the loyalty profile of the first user and loyalty data associated with loyal profiles of second users. Loyal data associated with the loyalty profiles of the first and second users may comprise at least one of a number of badges unlocked, a list of badges unlocked, progress in unlocking badges, a total number of loyalty points accumulated, rewards received, rewards redeemed, or milestones met.

According to another embodiment, a system for providing rewards to a user is provided. The system may comprise at least one memory storing instructions and at least one processor executing the instructions to perform operation. The operations may comprise receiving, from a social networking site, encrypted data associated with a social media account of a user, and linking a loyalty profile of the first user to the social media account of the first user. The operations may further comprise receiving transaction data associated with a purchase made by the first user, and determining, based on the transaction data, a merchant associated with the transaction data and a transaction category associated with the transaction data. The operations may further comprise assigning, in a graphical user interface associated with the loyalty profile of the first user, the transaction data to a merchant icon, based on the merchant associated with the transaction, and a badge icon, based on the transaction category. The operations may further comprise assigning, in the graphical user interface and based on the transaction data, at least one of a number of loyalty points to the merchant icon or a number of transaction points to the badge icon. The operations may further comprise determining at least one of whether a total number of loyalty points associated with the merchant icon exceeds a first threshold or whether a total number of transaction points associated with the badge icon exceeds a second threshold. The operations may further comprise generating a reward for the first user when at least one of the first or second thresholds is exceeded. The operations may further comprise requesting, via the graphical user interface, permission from the first user to display, on the social media account of the first user, information associated with the generated reward, and transmitting the information to the social media account of the first user for display after permission is granted. The operations may further comprise assigning, in the graphical user interface, additional loyalty points or transaction points to the merchant icon after the permission is granted.

In other embodiments, the at least one of the merchant icon or the badge icon may comprise a progress bar indicative of progress of the first user in reaching a milestone associated with at least one of the merchant icon or the badge icon. In some aspects, assigning at least one of the number of loyalty points or the number of transaction points may modify the progress bar.

In other embodiments, the operations may further comprise requesting, via the graphical user interface, permission from the first user to display loyalty data associated with the loyalty profile of the first user on the social media account of the first user. After permission is granted, the operations may further comprise displaying the loyalty data to the social media account of the first user. The loyalty data may comprise at least one of a number of badges unlocked, a list of badges unlocked, progress of the first user in unlocking badges, a total number of loyalty points accumulated, rewards received, rewards redeemed, or milestones met.

In some embodiments, the operations may further comprise receiving a history of a plurality of transactions associated with the first user, and generating the reward based on the transaction history. The transaction history may comprise at least one of a time, a date, a location, an amount spent, a merchant type, a merchant name, a total number of visits, or a frequency of visits associated with the transactions.

In other embodiments, the merchant icon may comprise a first progress bar and the badge icon may comprise a second progress bar. At least one of the first or second progress bars may be color-coded based on a rule associated with at least one of the total number of loyalty points or the total number of transaction points. In some embodiments, at least one of the first or second progress bars may be displayed in a first color when at least one of the total number of loyalty points or the total number of transaction points reaches 25% of the first or second threshold. Further, at least one of the first or second progress bars may be displayed in a second color when at least one of the total number of loyalty points or the total number of transaction points reaches between 25% and 50% of the first or second threshold. Additionally, at least one of the first or second progress bars may be displayed in a third color when at least one of the total number of loyalty points or the total number of transaction points reaches between 50% and 75% of the first or second threshold. Lastly, at least one of the first or second progress bars may be displayed in a fourth color when at least one of the total number of loyalty points or the total number of transaction points reaches between 75% and 100% of the first or second threshold. In some aspects, at least one of the merchant icon or the badge icon may be color-coded when at least one of the first or second thresholds is not exceeded, and may be grayed out when at least one of the first or second thresholds is exceeded.

In other embodiments, the operations may further comprise providing a social dashboard on the graphical user interface. The dashboard may comprise loyalty data associated with the loyalty profile of the first user and loyalty data associated with loyal profiles of second users. Loyal data associated with the loyalty profiles of the first and second users may comprise at least one of a number of badges unlocked, a list of badges unlocked, progress in unlocking badges, a total number of loyalty points accumulated, rewards received, rewards redeemed, or milestones met.

In another embodiment, the operations may further comprise receiving a second transaction data associated with a second purchase made by a second user, determining whether the second transaction data is related to the transaction data associated with the first user, and providing additional loyalty points or transaction points to the loyalty profiles of the first and second user when the second transaction data is related to the transaction data associated with the first user. Determining whether the second transaction data is related to the transaction data associated with the first user may further comprise determining whether a merchant associated with the second transaction and the merchant associated with the transaction data associated with the first user are the same.

Additional objects and advantages of the embodiments of the present disclosure will be set forth in part in the description which follows, and in part will be obvious from the description, or may be learned by practice of the embodiments of the present disclosure.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this present disclosure, illustrate disclosed embodiments of the present disclosure and, together with the description, serve to explain the principles of the present disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts. The disclosed embodiments include systems and methods, for example, for providing enhanced rewards to the users based on the user's transaction data. It should be appreciated, however, that the present disclosure is not limited to these specific embodiments and details, which are exemplary only. It is further understood that one possessing ordinary skill in the art, in light of known systems and methods, would appreciate the use of the embodiments of the present disclosure for its intended purposes and benefits in any number of alternative embodiments, depending on specific design and other needs. A financial institution and system supporting a financial institution are used as examples for the disclosure. The disclosure is not intended to be limited to financial institutions only.

Figure 1:
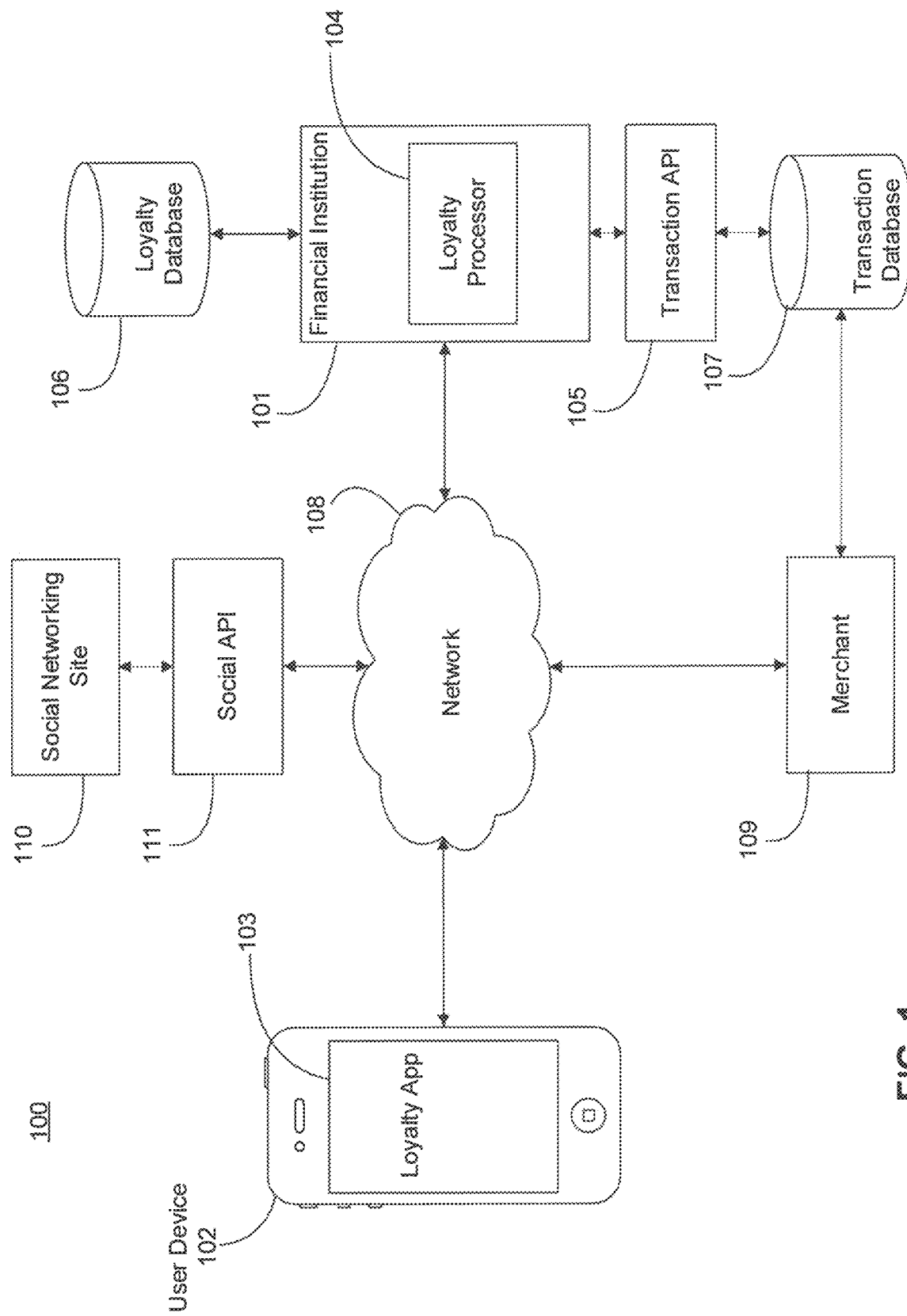
FIG. 1 shows an exemplary schematic diagram of a system for providing enhanced rewards to users based on transaction data, in accordance with the embodiments of the present disclosure.

FIG. 1 depicts an exemplary embodiment of a system 100 for providing enhanced rewards to users based on the user's transaction data according to various embodiments of the disclosure. The system 100 may include various network-enabled computer systems, including, as depicted in FIG. 1 for example, a financial service provider 101, which may include a loyalty processor 104; a user device 102, which may include a loyalty application 103; a loyalty database 106; a transactions database 107; a merchant 109; a social networking site 110; a transaction application programming interface (API) 105; a social API 111; and a network 108, which may be included as separate processors or combined into a single processor or device having the multiple processors. The processors may be combined, integrated, separated, or duplicated to support various applications. Also, a function described herein as being performed at a particular processor or device may be performed at one or more other processors and by one or more other devices instead of or in addition to the function performed at the particular processor.

Financial service provider 101, loyalty processor 104, social networking site 110, and merchant 109 may comprise one or more network-enabled computers. In the exemplary embodiment shown in FIG. 1, loyalty processor 104 is depicted as an integrated component of financial service provider 101. Other exemplary embodiments may disclose loyalty processor 104 as being a separate system from financial service provider 101. Other exemplary embodiments may comprise loyalty processor 104 being integrated into social networking site 110, merchant 109, and/or a third-party system. As referred to herein, a network-enabled computer system and/or device may include, but is not limited to, any computer device, or communications device including, a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

The components depicted in FIG. 1 may store information in various electronic storage media, such as, for example, loyalty database 106 and transaction database 107. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, but not be limited to, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the exemplary types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

User device 102 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, or other device. User device 102 may also be a tablet computer. Non-limiting examples of a tablet computer include an iPad, Kindle Fire, Playbook, Touchpad, and the like. User device 102 may be associated with an account holder having one or more financial accounts with financial account provider 101.

In various exemplary embodiments, an account holder may be any user or entity that desires to conduct a financial transaction using one or more accounts held at one or more financial account providers, such as financial account provider 101. Also, an account holder may be a computer system associated with or operated by such a user or entity. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. A financial account provider may be, for example, a bank, other type of financial account provider, including a credit card provider, for example, or any other entity that offers accounts to customers. An account may or may not have an associated card, such as, for example, a credit card for a credit account or a debit card for a debit account. The account card may be associated or affiliated with one or more social networking sites, such as a co-branded credit card.

As used herein, social networking site 110 may comprise a website that allows a user to create an account and provide user-specific information, including interests, and network with other users based on social connections. Examples of social networking sites may include, without limitation, Facebook, MySpace, Google+, LinkedIn, Twitter, Pintrest, Yelp, Foursquare, or the like. Social networking site 110 may house social media profiles holding social media data for one or more account holders, such as, for example, user name, user phone number, user address, user email address, user occupation, and/or user location information.

An account holder may download loyalty app 103 to user device 102. Loyalty app 103 may provide a graphical user interface to access services provided by loyalty processor 104. The services may include a loyalty profile. User device 102 may also access the loyalty profile using a web-based interface provided by financial account provider 101 and/or loyalty processor 104. When the user first launches loyalty app 103 on user device 102, loyalty app 103 may prompt the user to create a loyalty profile. Loyalty processor 104 may create the profile in response to input from the user and store the account with loyalty database 106. The user may create a username and password for the loyalty profile. The user may add other contact information to the profile, such as a physical address, email address(es), phone number(s), social media profile information, etc.

Loyalty processor 104 may allow the user to link one or more financial accounts at financial account provider 101 with their loyalty profile. The user may have a separate username and password associated with their one or more financial accounts. The user may provide their financial account(s) usernames and password to their loyalty profile using loyalty app 103. Loyalty processor 104 may associate the one or more financial accounts with the user's loyalty profile using the provided username and password.

Thereafter, the user may conduct a financial transaction (e.g., make a purchase) with merchant 109 using the one or more financial accounts. The transaction data may be stored in transaction database 107 by the merchant 109 once the transaction is completed. If the financial account is linked with the loyalty profile, loyalty processor 104 may receive the transaction data from transaction database 107 via transaction API 105. The transaction data may include meta-data information such as the transaction date, the transaction amount, a merchant identifier (associated with merchant 109), the transaction location, a merchant logo, a merchant category, the number of the card used for the transaction, the last four digits of the card used for the transaction, etc. Loyalty processor 104 may receive the transaction data and associate it with the user's loyalty profile.

Loyalty processor 104 may store the transaction data in loyalty database 106. The transaction data may be received on an hourly, daily, weekly, monthly, or other regular basis. Loyalty processor 104 may request the transaction data from transaction database 107 at irregular intervals. Loyalty processor 104 may request transaction data for a user each time the user logs in to loyalty app 103.

Loyalty processor 104 may credit the loyalty profile with loyalty points, transaction points, and/or badges based on the transaction data. The loyalty points, transaction points, and badges will be explained in conjunction with FIGS. 3A-3E. Loyalty processor 104 may credit the user with loyalty points that can be redeemed at a specific merchant. The number/amount of loyalty points and/or transaction points credited to the user's loyalty account may be based on the number of times the user has visited that merchant. For example, if a user has purchased coffee at a particular coffee shop for the third time in a year using a financial account that is linked to his loyalty profile, after the fourth visit, loyalty processor 104 may assign loyalty points to the user's loyalty profile for that coffee shop. In addition, loyalty processor 104 may assign transaction points to the Food badge on the user's loyalty profile for making a transaction in the Food category.

Figure 2:
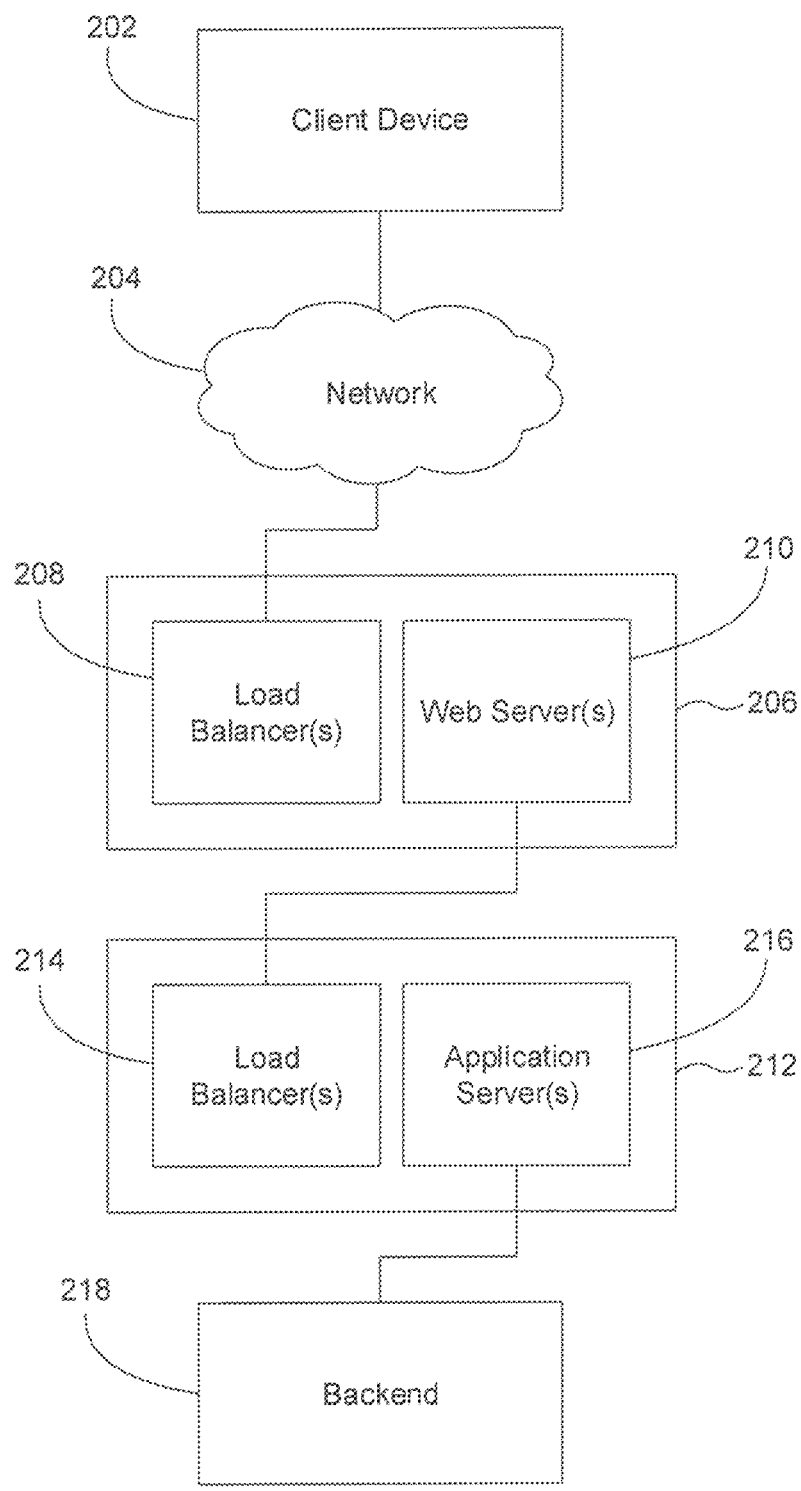
FIG. 2 shows an exemplary schematic diagram of a system for providing enhanced rewards to users based on transaction data, in accordance with the embodiments of the present disclosure.

FIG. 2 depicts an example system 200 for providing enhanced rewards to a user. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer. Client device 202 may be similar to buyer device 102*a* and/or seller device 102*b*. For instance, client device 202 may be any computer device, or communications device including, but not limited to, a server, a network appliance, a personal computer (PC), a workstation, a mobile device, a phone, a handheld PC, a personal digital assistant (PDA), a thin client, a tablet computer, a smartphone, a fat client, an Internet browser, or other device. Client device 202 may also be a tablet computer. Non-limiting examples of a tablet computer include an iPad, Kindle Fire, Playbook, Touchpad, and the like. Client device 202 may be associated with an account holder having one or more financial accounts with financial account provider 101. Client device 202 may be configured to execute one or more applications. The one or more network-enabled computers of the example system 200 may execute one or more software applications to enable, for example, network communications.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 208 may distribute workloads across, for example, web server(s) 210 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 and 214 may include software that monitoring the port where external clients, such as, for example, client device 202, connect to access various services of a financial institution or third party (such as system 100 shown in FIG. 1), for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above. That is, load balancers 214 may be implemented in hardware and/or software. Load balancer(s) 214 may implement numerous features, including, without limitation: asymmetric loading; priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200 and/or system 100, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 210 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributes system similar to system 200 and/or system 100. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a loyalty processor (e.g., processor 104 shown in FIG. 1) and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. Backend 218 may be associated with one or more servers that enable the various services provided by system 100.

Figure 3A:
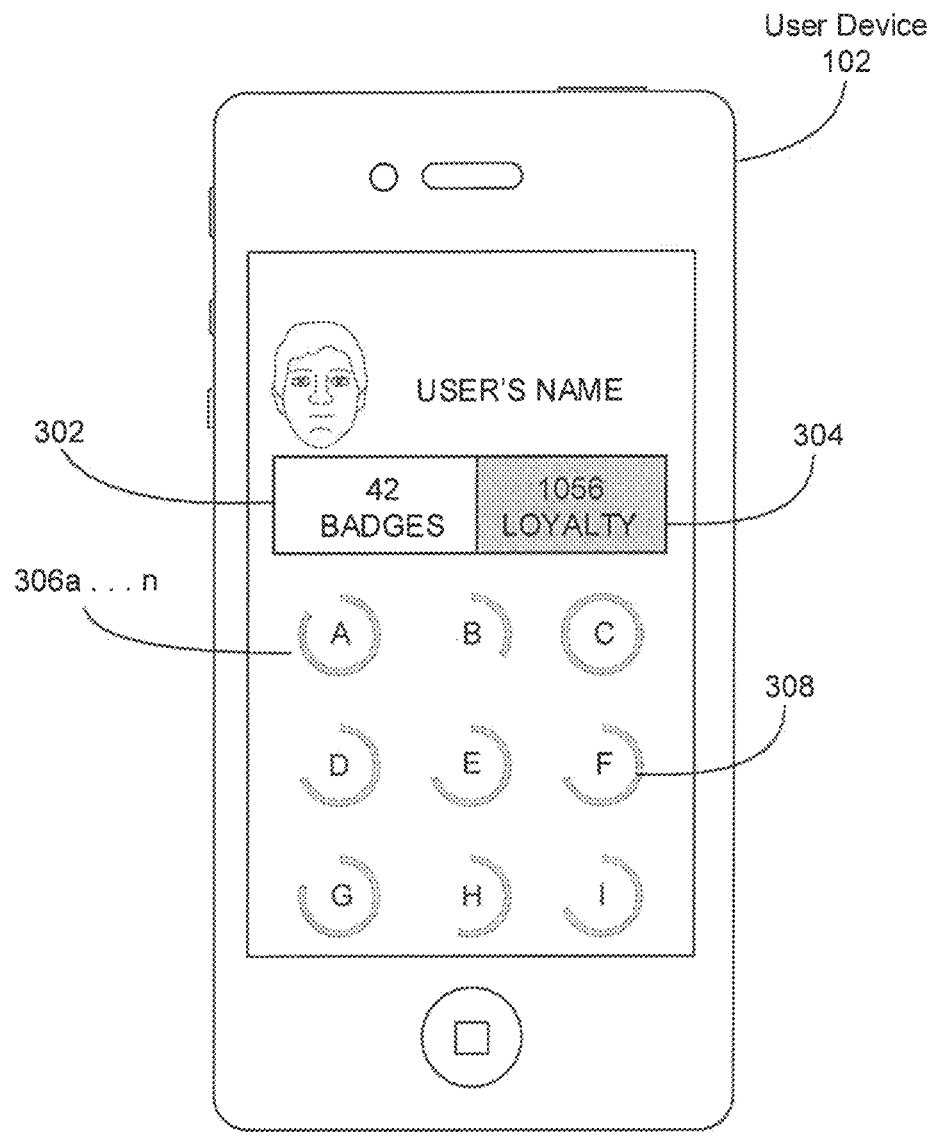
FIGS. 3A-3E show exemplary features of a loyalty profile provided on a graphical user interface, in accordance with the embodiments of the present disclosure.
Figure 3B:
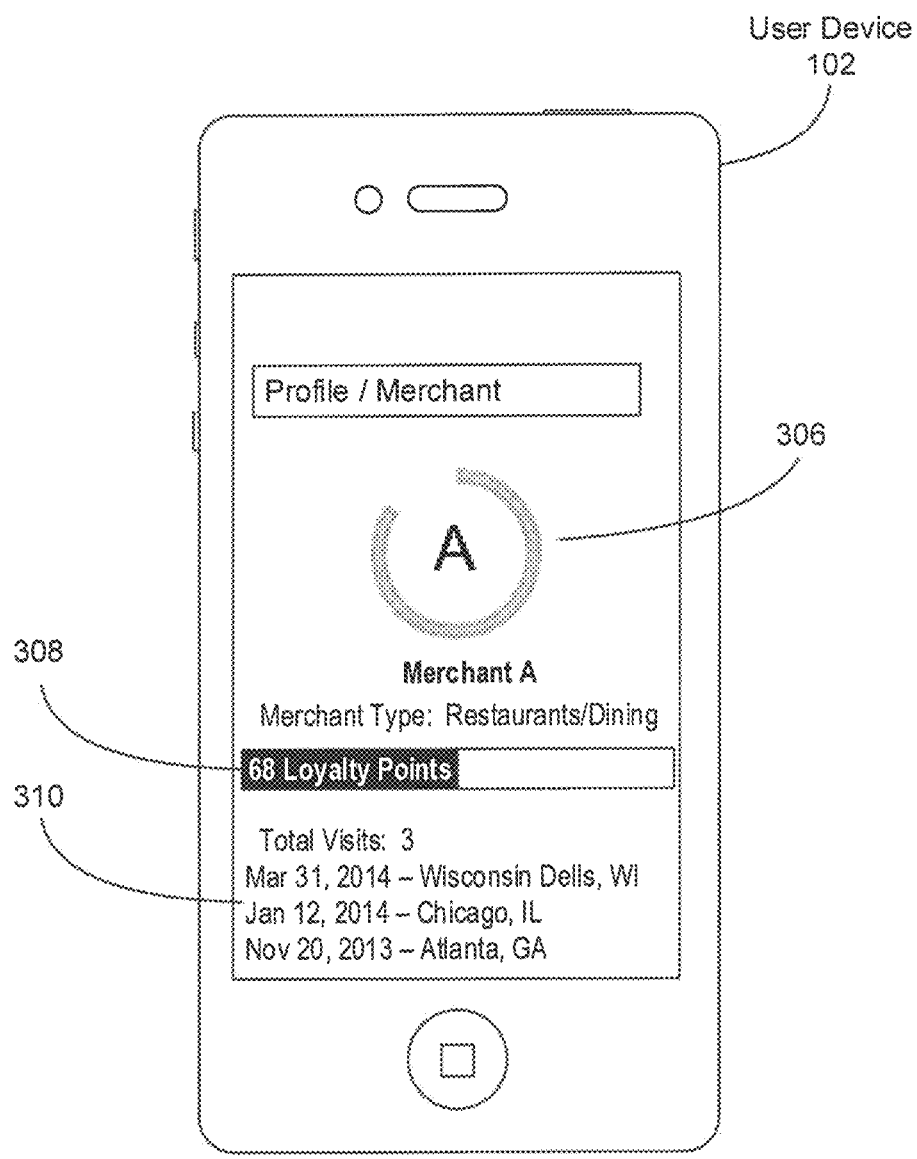

FIGS. 3A and 3B depict example embodiments of graphical user interfaces (GUIs) 300 that may be presented to the user on user device 102 via loyalty application 103. In particular, FIG. 3A shows an example embodiment of an interface 300 on user device 102 for the user's loyalty profile. The interface 300 may include the name of the user for the loyalty profile. The interface 300 may also include an image of the user for the loyalty profile. The interface 300 may display the number of loyalty points 304 that the user has accumulated. If the user selects option 304, the interface 300 may display a series of merchant icons 306a . . . n, where each merchant icon corresponds to a merchant where the user has previously earned loyalty points (based on purchases made with that merchant using an account that is linked to the loyalty profile). The merchant icons 306a . . . n may be displayed in order of where the customer made his most recent purchases. In this example, the last purchase made by the user was at Merchant A.

As shown in FIG. 3A, each merchant icon may include a radial progress bar 308 that is displayed around the merchant logo which indicates the progress of the user in reaching a milestone associated with the merchant. For example, the radial progress bar 308 may be indicative of the number of loyalty points earned by the customer at that merchant, relative to some milestone. The customer may accumulate loyalty points with that merchant based on prior purchases made with that merchant. The number of loyalty points received per visit will be determined by an algorithm. Loyalty points earned per revisit may differ from one revisit to another and from one merchant to another. Loyalty processor 104 may retrieve transaction data and determine which transactions correspond to which merchants based on the merchant identifier associated with each transaction. Loyalty processor 104 may assign loyalty points to the user's loyalty profile based on the transaction amount, the transaction date, how many prior visits and purchases the customer has made with that merchant, and other factors. For example, the more times a user visits a merchant a makes a purchase, the greater the number of loyalty points that loyalty processor 104 may assign to that user's loyalty profile.

Loyalty processor 104 may limit the number of loyalty points that a user can earn with a given merchant. This limit may vary based on the merchant. The limit may be set by the merchant 109, the financial account provider 101, and/or a third party. FIG. 3B shows an example embodiment of a merchant interface for a user's loyalty points with a specific merchant. The user may access this merchant interface by selecting one of the icons 306a . . . n as shown in FIG. 3A. The interface includes the merchant logo 306 (in this example, a logo for merchant A). The interface shows the number of loyalty points 308 that the user has accumulated (in this case, 68 loyalty points). The interface may display the transaction history 310 of the user. The transaction history 310, for example, may be a list of the dates when the user has visited that merchant and made a purchase using an account that is linked to his loyalty profile. The transaction history 310 may also display the specific locations associated with the merchant that the user has visited previously. In this example, the user has made three visits to the merchant A location. In other examples, the transaction history 310 may list the location of each visit, a credit card number used, a transaction amount, a transaction date, a transaction time, a transaction location, a merchant name, a merchant type, or a merchant logo associated with the purchase and other information obtained by loyalty processor 104 from the transaction data.

The loyalty points 308 may be displayed as a percentage and/or a status bar. Each merchant may be associated with one or more milestones, or thresholds. A threshold may be a certain number of loyalty points that a use must accumulate with that merchant before being given access to certain rewards or discounts associated with the loyalty account. The threshold may vary based on the merchant. The thresholds may be set by loyalty processor 104, financial account provider 101, the merchant 109, and/or a third party. When the user reaches or exceeds a threshold, loyalty processor 104 may provide one or more rewards to the loyalty profile and/or to the financial accounts that are linked to the user's loyalty profile. In some embodiments, the loyalty processor 104 may send an update to the loyalty database 106 that the user has reached or exceeded a threshold. The loyalty processor 104 may update the merchant 109 that the user has reached or exceeded a threshold. The merchant 109 may transmit a reward for the user to the loyalty processor 104. The loyalty processor 104 may send the reward, such as a code, to the user device 102 for display. The loyalty processor 104 may update the loyalty database 106 with information related to the reward(s) accumulated by the user. The loyalty processor 104 may provide rewards points for a credit card account of the user. Loyalty processor 104 may credit one of the user's financial accounts with cash. The user may be provided with one or more gift cards for redemption at the merchant associated with the milestone. The user may receive coupons, discounts, offers, and/or rewards for redemption with that merchant. The offer or reward may be provided as a redemption code and/or bar code.

Figure 3C:
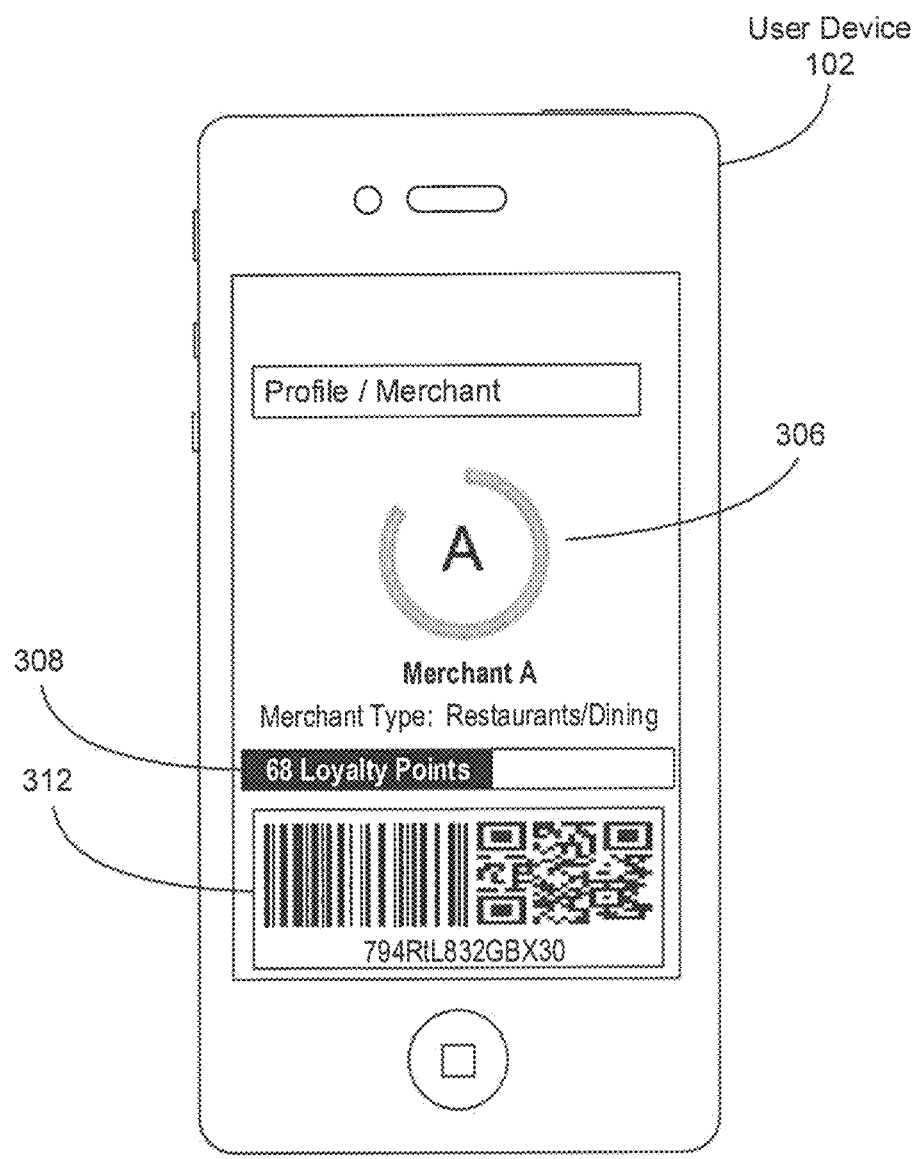

FIG. 3C shows an example embodiment of the merchant interface from FIG. 3B when the user has met or exceeded a threshold for a given merchant. In this example, the threshold for merchant A is 100 loyalty points. Once the user has accumulated 100 loyalty points with this merchant in his loyalty account, loyalty processor 104 may provide a reward 312 for redemption. The reward 312 may be a gift card, coupon, offer, discount, etc. that the user can redeem with the merchant (in this case, with merchant A). This reward 312 may comprise a QR code or bar code generated by the merchant 109, financial institution 101, and/or loyalty processor 104. The user may present the bar code/QR code at a physical location of the merchant (merchant A) to redeem the reward(s). The reward 312 may comprise a redemption code, which the user may enter at an online website hosted by the merchant (merchant A). The merchant 109 will validate the code and provide the discount/reward to the user. In some embodiments, each discount/reward may comprise a unique identifier, and the merchant 109 may store the unique identifiers associated with each reward transmitted to users in a database. The merchant may validate the code by verifying that the unique identifier associated with the discount/reward exists in the database associated with the merchant 109. Once the user redeems the reward 312, loyalty processor 104 and/or the merchant may mark the reward as redeemed so that the user cannot re-use it. In this way, the loyalty profile gives the user a unified loyalty profile as opposed to having to create a loyalty profile with each merchant separately.

Figure 3D:
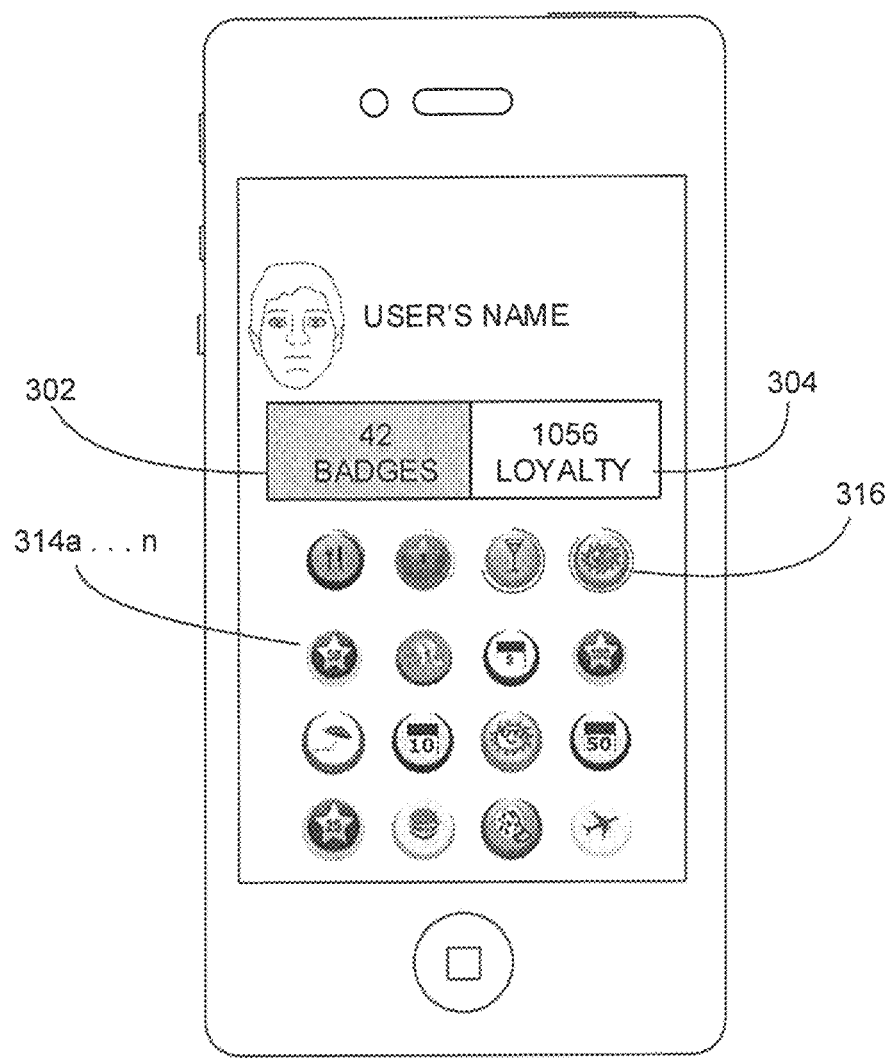
Figure 3E:
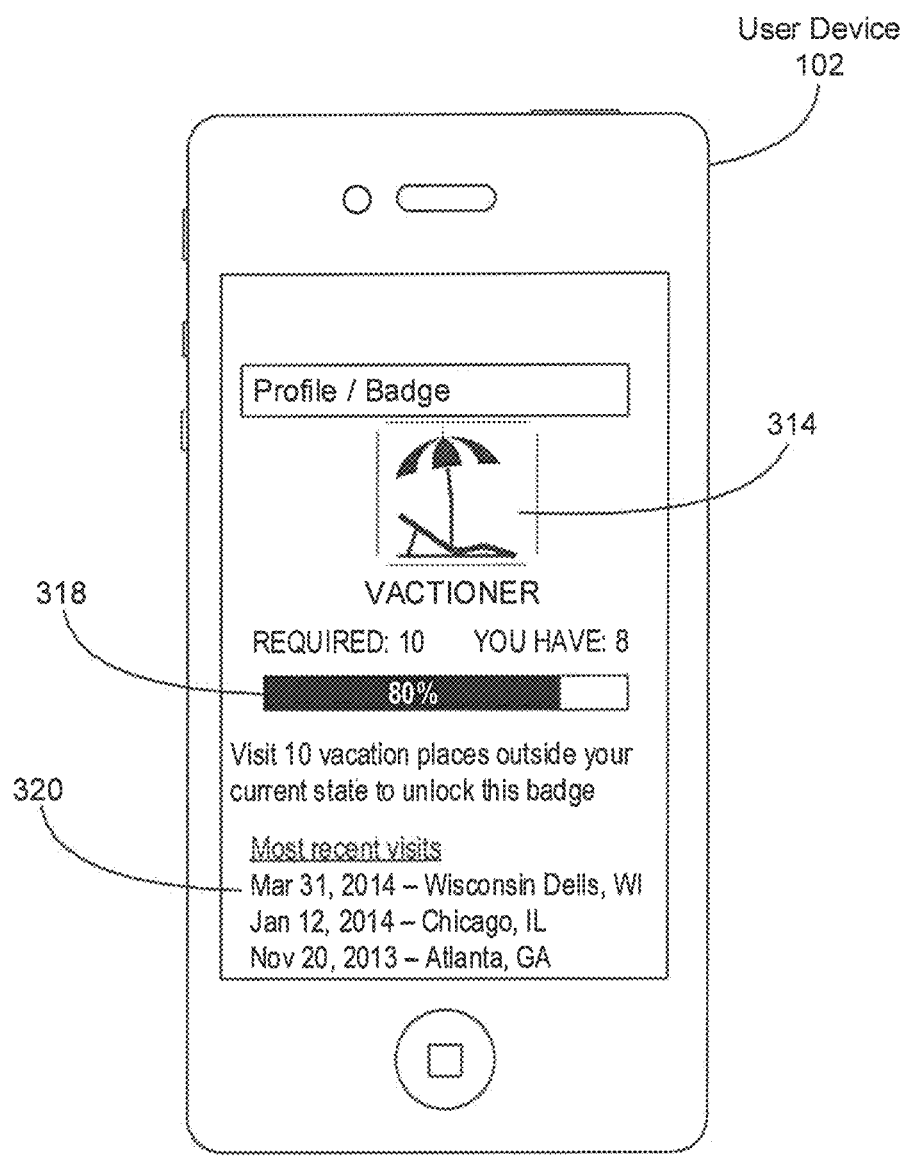

Loyalty processor 104 may also provide one or more "badges" to the user's loyalty account based on the received transaction data from transaction database 107. A badge may represent a certain type of transaction category and may be used to reward users for consistent, regular spending in a certain category. Loyalty processor 104 may create a plurality of badges, where each badge is associated with a transaction category. Data associated with each badge may be stored in the loyalty processor 104, the loyalty database 106, the user device 102, or any combination thereof. An example embodiment of the badge interface is shown in FIGS. 3D and 3E. FIG. 3D shows the badge interface that a user may access by selecting the badges icon 302. In this example, the user has 42 badges. The badges may be created by loyalty processor 104, financial account provider 101, merchant 109, and/or one or more third parties. Each badge is represented by an icon (shown as 314a . . . n as shown in FIG. 3D). Initially, when the user first creates a loyalty profile, the badges may be in a "locked" state. As the user makes purchases and expenditures using his linked financial accounts, the badges may be unlocked, based on the transaction category or categories associated with the user's purchases. In other embodiments, a badge may not be created by loyalty processor 104 in the user's loyalty profile until that user has made a purchase that falls within the badge's transaction category (or categories). The badge interface may display the total number of badges the user has unlocked and all the badge icons. The badges 314a . . . n may be ordered based on the date the badge was associated to a transaction. Most recent transaction associations may be displayed first.

Badges may include, for example and without limitation, Food, Travel, Vacation, Entertainment, Health and Fitness, Sports, Shopping, Games, Calendar, total number of transactions, frequency of transactions, total number of referrals made, etc. For example, the Food badge may be associated with purchases made at restaurants. The Travel badge may be associated with purchases related to traveling (such as airline tickets, train tickets, gas expenses, etc.). The Shopping badge may be associated with clothing purchases. A Games badge may be associated with electronics purchases. Badges created by loyalty processor 104 may be based on the location of a purchase. The Vacation badge may be associated with purchases that are made outside of a certain radial distance from the user's home address. Badges created by loyalty processor 104 may be based on the timing of a purchase. A user's purchase may be assigned to a Calendar badge if the user makes a minimum number of purchases within a certain time frame. For example, if the user makes 10 purchases within a week, the purchases may be assigned to the Calendar badge. Loyalty processor 104 can assign to single purchase to one or more badges. For example, if the transaction data indicates the user spent $50 at a particular restaurant, this transaction will be assigned to the Food badge. If the transaction data indicates that the restaurant is located in a different state from where the user lives, the transaction data may also be assigned to the Vacation badge.

When loyalty processor 104 receives a user's transaction data from transaction database 107, loyalty processor 104 will determine the category for each purchase in the transaction data, and assign that purchase to one or more badges based on the transaction category. The badges created by loyalty processor 104 may be associated with transaction categories. Transaction data associated with a user's purchase may include a merchant identifier. The merchant identifier may have been previously associated with one or more categories (restaurant, electronics, grocery store, etc.) by financial institution 101, loyalty processor 104, and/or a third party. When loyalty processor 104 receives transaction data, it may assign each purchase to one or more badges based on the merchant identifier and the categories associated with each of the badges.

Loyalty processor 104 may associate a threshold or milestone with each badge. Location processor 104 may assign a different threshold to each badge. The thresholds may be provided by financial account provider 101, merchant 109, and/or a third party. In order to "unlock" a badge, the user must reach or exceed the threshold associated with the badge. An unlocked badge shown in FIG. 3D may be grayed out, while a locked badge may be shown in color. In other embodiments, an unlocked badge may be in color, while a locked badge may be grayed out. FIG. 3E shows an example embodiment of the badge interface for a specific badge. In this example, the user is viewing the Vacation badge. The user may view a specific badge interface by selecting the badge icon from icons 314a . . . n (as shown in FIG. 3D). The badge interface includes the badge icon 314, a progress bar 318 that shows how close the user is to unlocking the badge, and a history of transactions 320 that have been assigned to that badge by location processor 104. In this case, the status 318 may indicate the threshold for this badge (in this case, 10 visits to places outside the user's current state of residence). The status 318 may indicate that the user is 80% of the way to unlocking the badge (8 visits out of 10). The transaction history 320 may show the date and locations of the most recent visits. The transaction history 312 may also show the amount spent, a merchant visited, etc. Thresholds may be, for example and without limitation, a predetermined amount that must be spent within that category, a minimum number of visits to merchants within the category, a minimum amount that must be spent at each visit within the category, location-based, and/or time-based.

In FIG. 3D, if the badge is in the locked state, the badge icon 314a . . . n may be color-coded and a radial progress bar 316 may be present around the badge icon 314a . . . n indicating how close the user is to unlocking the badge. The radial progress bar 316 may be color-coded based on one or more rules from the loyalty processor 104. For example, if the badge is less than or equal to 25% completion, the radial progress bar may be red. If the badge is between 25% and 50% completion, the radial progress bar may be yellow. If the badge is between 50% and 75% completion, the radial progress bar may be blue. If the badge is between 75% and 100% completion, the radial progress bar may be green.

When a user has unlocked a badge, the badge icon 314a . . . n may be grayed out and the radial progress bar 316 may disappear. The loyalty processor 104 may provide rewards to the loyalty profile in different forms once a user has unlocked a badge. The rewards may include points that can be carried over to the user's credit card account points for a financial account that is linked to the loyalty profile. The rewards may include receive cashback that is credited to the user's financial accounts. The rewards may include gift cards at various merchants, such as merchant 109. The rewards may be associated with the badge category and/or associated with merchants that sell goods and services in that category. The rewards may be coupons for merchants in the same category as the badge, but merchants that the user has not yet visited (based on loyalty processor 104 reviewing past transaction data for the user).

For example, if the user unlocks the Foodie badge by visiting 10 restaurants within the required time period, loyalty processor 104 may provide one or more coupons or discounts to the user's loyalty account. The coupons may be for a restaurant that the user has not visited. The coupons may be for a restaurant that was previously visited by the user. The coupons may be for a restaurant that is similar to one or more restaurants previously visited by the user. For example, loyalty processor 104 may use a smart algorithm to provide one or more rewards based on the user's transaction history. The loyal processor 104 may review the transaction data associated with the user's loyalty profiles' badges (stored in loyalty database 106) and determine that eight of the ten restaurants most recently visited by the user were Japanese restaurants. Loyalty processor 104 may provide one or more rewards that include discounts to a Japanese restaurant that the user has not yet visited. The discounts may be further based on the location of the user (e.g., the discount may be for a Japanese restaurant in the user's hometown, or within a predetermined distance of where the user works). In other embodiments, transaction data may indicate that the user is traveling. The reward/discount may be for a merchant in the city where the user is currently staying.

In another example, a loyalty account holder ("John") enjoys Mexican foods and lives in Chicago. John may unlock the Food badge in his loyalty account by visiting 25 restaurants (out of which 15 are Mexican restaurants). In this example, there may be a new Mexican restaurant in Chicago that is looking for new customers. If John has never visited this new Mexican restaurant in the past, the new Mexican restaurant may interact with loyalty processor 104 to provide one or more targeted advertisements to John to encourage him to visit the new Mexican restaurant, based on his past visits to other, similar establishments.

The amount of the reward may be based on the past visits associated with the unlocked badge. For example, if the user spent an average of $25 per each restaurant visit over the minimum 10 visits, then the discount may be for $25 off the next meal. Loyalty processor 104 may allow merchants, such as merchant 109, to directly provide discounts and rewards to the user based on the user unlocking one or more badges.

In various embodiments, loyalty processor 104 may provide an advertising/marketing platform where merchants and other companies/advertisers may reach out to potential customers. Advertisers and/or merchants may sign-up with financial institution 101 to advertise to account holders who have a loyalty profile. Advertising may be in the form of offers, discounts, coupons, etc. When a loyalty profile holder reaches certain thresholds like unlocking a badge, one of the advertisers' offers will be presented to the user as a reward for reaching the threshold. Loyalty processor 104 may use complex smart algorithms to identify which ads to present to the account holder based at least on their transaction history. For example, the complex smart algorithm may utilize information associated with the user's past purchases and the user's location in order to determine which offers would be most beneficial to the user and to the merchants 109 associated with the loyalty processor 104.

The rewards system, according to the exemplary embodiments of the present disclosure, provides an opportunity to merchants to utilize this unified loyalty platform to reward customer loyalty. Since the system can track customer loyalty per merchant, every merchant can track customer's loyalty towards their business (on reaching certain milestones). The system can build custom merchant pages for participating merchants based on their needs. This way, the loyalty processor 104 will evolve as a platform supporting the rewards programs of different merchants. This is great for merchants who cannot afford to build and maintain their own loyalty program/applications and/or like to leverage financial institution 101's loyalty platform. It is also great for customers because they will only need to maintain a single loyalty account instead of creating multiple loyalty accounts with multiple businesses.

Loyalty processor 104 may exchange data with social networking site 110 via social API 111. The user may use loyalty app 103 to grant loyalty processor 104 permission to link to the user's social media account at social networking site 110 (for example, by providing a username and password associated with the user's social media account(s)). Loyalty processor 104 may link the user's loyalty profile with his social media account using one or more APIs, such as social API 111. Social API 111 may allow certain data to be transmitted so that social networking site 110 may communicate with loyalty processor 104 and/or financial account provider 101. Social API 111 may prevent data other than approved data from being transmitted For example, the API may only support user name, user e-mail address, user identification information, and/or user location information to be transmitted from the social networking site 110 to the loyalty processor 104. Also, social API 111 may allow the user's relationship data to be transmitted to loyalty processor 104 if the user opts-in to allow relationship data to be provided to loyalty processor 104. For example, relationship data may include data indicative of a group of people, such as family, close friends, and/or colleagues. In various embodiments, social API 111 may be part of loyalty processor 104 and/or financial institution 101.

Social API 111 may provide encryption and filtering functionality to prevent, for example, identity theft and fraudulent transactions. For example, the social API 111 may filter out personally identifying information that is unnecessary to carry out the claimed methods, such as, social security numbers. A social API 111 may also encrypt, for example, account and routing numbers to ensure that any passing account identifying data is secure during transmission and storage.

Loyalty processor 104 may post information about the user's loyalty profile to his social media account at social networking site 110. Loyalty processor 104 may request, via a GUI, permission from the user to display information associated with the user's loyalty profile on the user's social media account. Loyalty processor 104 may allow the user to designate friends and associates who have accounts at social networking site 110 to view loyalty data from the user's loyalty profile. Loyalty data may include the number badges unlocked, a list of the badges unlocked, the user's progress in unlocking other badges, loyalty points accumulated per merchant, total loyalty points accumulated, rewards received, rewards redeemed, milestones met, etc. Once permission is granted from the user, loyalty processor 104 may post this information to a feed or status associated with the user's social media account at social networking site 110. Once posted, the user's friends and associates may have the ability to comment on the posts, "like" them, re-post them, share the posts, etc. Loyalty processor 104 may provide additional loyalty points to the user's loyalty profile if the user permits loyalty processor 104 to loyalty data to the social media account. For example, loyalty processor 104 may double the loyalty points received for each of the user's subsequent transactions based on the user's decision to post status updates related to his loyalty data and share it with friends and associates on his social media account.

Loyalty processor 104 may also provide additional loyalty points to a user who "tags" a friend on a post related to loyalty data. Loyalty processor 104 may provide additional loyalty points if the tagged friend then signs up for a loyalty profile within a predetermined period of time. Loyalty processor 104 may generate a message or post for the user and provide it to the user to post to his social media site. The post may describe a recent achievement of the user (e.g., "John just unlocked the Food badge!"). Based on common interests and transaction history between friends, loyalty processor 104 will suggest places to visit to the user. Merchants can sign up with loyalty processor 104 to reach out to users via this channel as well.

The loyalty profile of the user may include a social dashboard on the graphical user interface. On the dashboard, various information may be displayed. For example, loyalty data associated with the loyalty profile of the user may be displayed, as well as loyalty data associated with loyalty profiles of second users. For instance, loyalty data obtained from loyalty profiles of a user's tagged friends may be displayed on the social dashboard. As such, the user may be able to "like," "comment," or perform other social operations on information displayed on the user's loyalty profile dashboard, thereby allowing the user to interact with the user's connections and friends on the loyalty profile. Loyalty data displayed may include, but are not limited to, a number of badges unlocked, a list of badges unlocked, progress in unlocking badges, a total number of loyalty points accumulated, rewards received, rewards redeemed, or milestones met.

Figure 4:
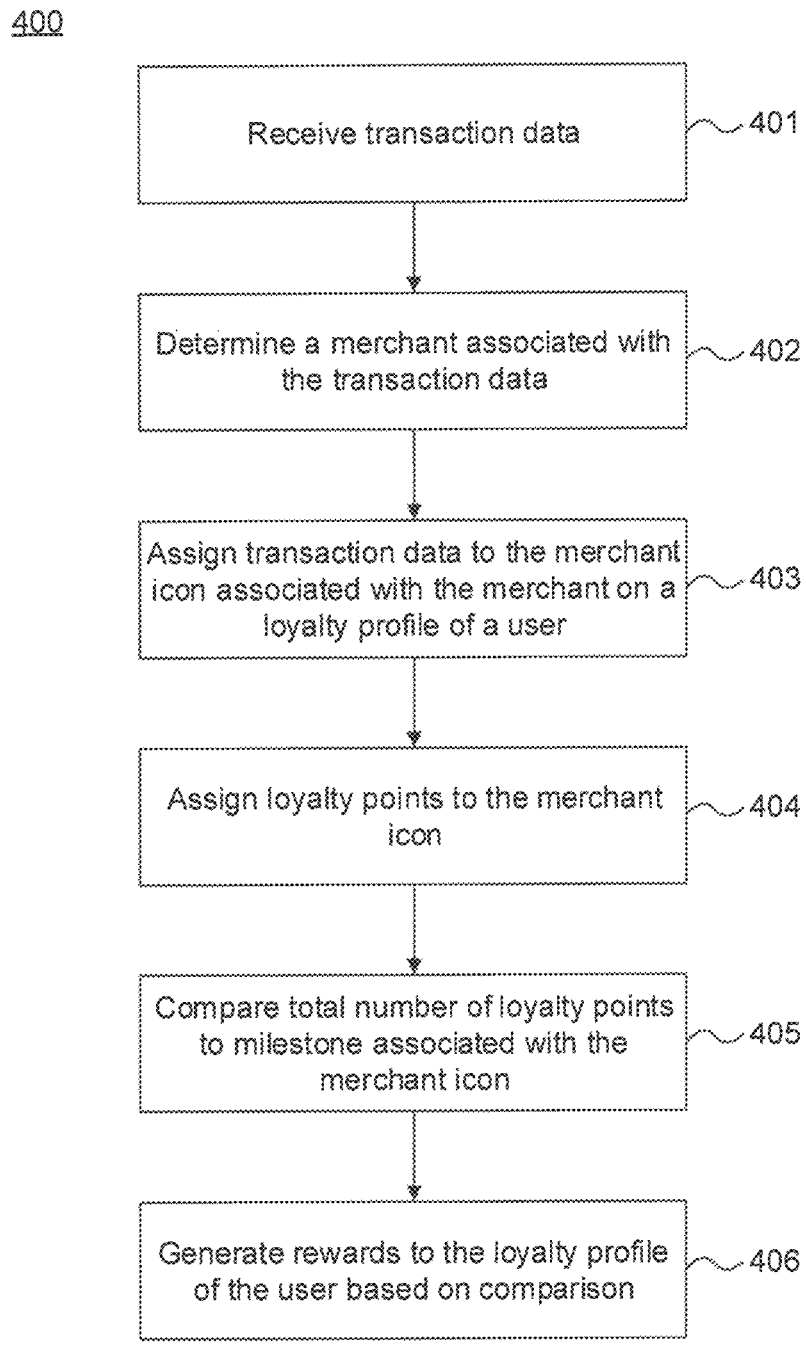
FIG. 4 shows an exemplary process of providing enhanced rewards to a user, in accordance with the embodiments of the present disclosure.

FIG. 4 is a flow chart illustrating a method for providing enhanced rewards to a user. This exemplary method is provided by way of example. The method 400 shown in FIG. 4 can be executed or otherwise performed by one or more combinations of various systems. The method 400 as described below may be carried out by the system for providing enhanced rewards to a user, as shown in FIG. 1, by way of example, and various elements of that system are referenced in explaining the method of FIG. 4. Each block shown in FIG. 4 represents one or more processes, methods, or subroutines in the exemplary method 400. Referring to FIG. 4, the exemplary method 400 may begin at block 401.

At block 401, a loyalty processor 104 may receive transaction data associated with a user from a merchant and/or a transaction database. The transaction data may include meta-data information associated with one or more transactions, such as a credit card number used, a transaction amount, a transaction date, a transaction location, a merchant name, a merchant type, or a merchant logo associated with the purchase, last four digits of the card used for the transaction, etc.

Method 400 may continue to block 402, at which the loyalty processor 104 may determine a merchant associated with the transaction data. Loyalty profile may comprise one or more merchant identifiers, where each identifier is associated with a merchant that is part of the loyalty program. When a user makes a purchase with that merchant, the transaction data may include the merchant identifier associated with that merchant. For example, the loyalty profile may include a merchant identifier for a merchant A. When the user purchases merchant A's product, the transaction data may be received by the loyalty processor and the loyalty processor may assign that transaction to the merchant identifier in the loyalty account. At block 403, the loyalty processor 104 may assign the transaction data to a merchant icon associated with the merchant on the loyalty profile of the user. For example, once the loyalty profile identifies merchant A as the merchant associated with the transaction data, the loyalty profile may assign the transaction data to the merchant icon associated with merchant A on the user's loyalty profile.

Method 400 may further continue to block 404, at which the loyalty processor 104 may assign loyalty points to the merchant icon on the user's loyalty profile based on the transaction data. The amount of loyalty points may be determined based on the number of times the user has made a purchase with that merchant within a certain predetermined amount of time. The loyalty account may be designed to reward customers who make regular, repeat visits and/or purchases with a given merchant. The amount of loyalty points may be based on the amount the user spent in a given transaction. The amount of loyalty points may be based on the location of the transaction. The amount of loyalty points may be based on the date and time of the transaction relative to a previous purchase at that merchant. For example, the loyalty processor 104 may credit the user's loyalty account with 2 loyalty points for every dollar spent in a transaction with a given merchant if that transaction was less than a month after a previous transaction with the same merchant. If the transaction was more than a month after a previous transaction, then the loyalty processor 104 may credit the loyalty account with 1 loyalty point for every dollar spent. The loyalty processor 104 may increase the amount of rewards points credited to the loyalty profile for each subsequent visit to that merchant. The loyalty points may be assigned to the merchant identifier associated with the transaction. Thus, if the user makes a purchase at merchant A, he may receive "merchant A" loyalty points. Assigning the number of loyalty points to the merchant icon may modify the progress bar associated with the merchant icon. For example, if the user accumulates 50 loyalty points at merchant A, 50 loyalty points may be assigned to the merchant icon associated with merchant A, and the progress bar may be modified to indicate the additional 50 loyalty points the user has accumulated with the transaction.

At block 405, for a given merchant identifier at the user's loyalty profile, the loyalty processor 104 may compare the total number of loyalty points associated with that merchant icon with a threshold or milestone associated with the merchant icon. The threshold or milestone may be a predetermined number of loyalty points necessary to unlock one or more rewards. The threshold or milestone may be determined by the financial institution, by the loyalty processor, by the merchant associated with the merchant identifier, and/or by one or more third parties. At block 406, the loyalty processor 104 may generate a reward to the loyalty profile of the user based on the comparison if the total number of loyalty points associated with a given merchant icon exceeds the threshold associated with that merchant icon (from block 405). The reward may be based on the transaction history of the user. For example, the loyalty processor 104 may receive a history of a plurality of transactions associated with the user, and generate a reward based on the transaction history. The transaction history may include, but is not limited to, a time, a date, a location, an amount spent, a merchant type, a merchant name, a total number of visits, or a frequency of visits associated with the transactions. The reward may be a gift card, coupon, offer, discount, etc. that the user can redeem with the merchant. This reward may comprise a QR code or bar code generated by the merchant, the financial institution, and/or the loyalty processor 104. The user may present the bar code/QR code at a physical location of the merchant to redeem the reward(s). The reward may comprise a redemption code, which the user may enter at an online website hosted by the merchant. The merchant will validate the code and provide the discount/reward to the user. In this way, the loyalty profile gives the user a unified loyalty profile as opposed to having to create a loyalty profile with each merchant separately.

Figure 5:
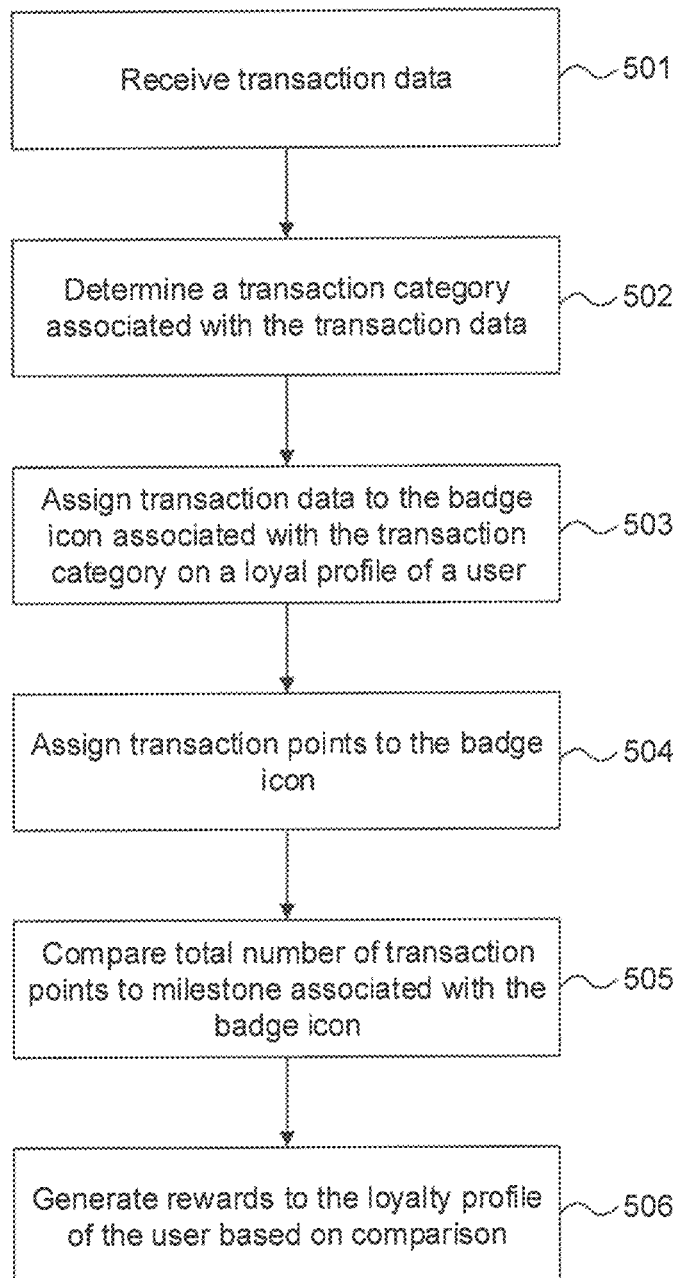
FIG. 5 shows an exemplary process of providing enhanced rewards to a user, in accordance with the embodiments of the present disclosure.

FIG. 5 is a flow chart illustrating a method 500 for providing enhanced rewards to a user. This exemplary method is provided by way of example. The method 500 shown in FIG. 5 can be executed or otherwise performed by one or more combinations of various systems. The method 500 as described below may be carried out by the system for providing enhanced rewards to a user, as shown in FIG. 5, by way of example, and various elements of that system are referenced in explaining the method of FIG. 5. Each block shown in FIG. 5 represents one or more processes, methods, or subroutines in the exemplary method 500. Referring to FIG. 5, the exemplary method 500 may begin at block 501. Blocks 501 and 502 may be similar to blocks 401 and 402 in FIG. 4. For example, at block 501, a loyalty processor 104 may receive transaction data associated with a user from a merchant and/or a transaction database. The transaction data may include meta-data information associated with one or more transactions, such as a credit card number used, a transaction amount, a transaction date, a transaction location, a merchant name, a merchant type, or a merchant logo associated with the purchase, last four digits of the card used for the transaction, etc.

Method 500 may continue to block 502, at which the loyalty processor 104 may determine a merchant associated with the transaction data. Loyalty profile may comprise one or more merchant identifiers, where each identifier is associated with a merchant that is part of the loyalty program. When a user makes a purchase with that merchant, the transaction data may include the merchant identifier associated with that merchant. For example, the loyalty profile may include a merchant identifier for merchant A. When the user purchases merchant A's product, the transaction data may be received by the loyalty processor 104 and the loyalty processor 104 may assign that transaction to the merchant identifier in the loyalty account.

At block 503, the loyalty processor 104 may assign the transaction data received to a badge icon associated with the loyalty profile based on a transaction category associated with the transaction data. A user's loyalty profile may comprise one or more badges, wherein each badge represents one or more categories for a transaction. Examples of badges may include, without limitation, Food (associated with spending at restaurants), Travel (associated with travel-related spending), Shopping (associated with spending on clothes and/or electronics), etc. Badges may be based on the location associated with a transaction, or the date and time. Examples of badges may include, without limitation, Vacation (associated with spending that is more than a predetermined distance from the spender's hometown), and Calendar (associated with a plurality of transactions that occur within a predetermined period of time). The transaction data may include the merchant category, the date and time of the transaction, and the location. The location processor may assign each transaction to one or more badges based on this information.

At block 504, for each badge, the loyalty processor 104 may assign transaction points to the badge icon associated with the badge icon. The transaction points may be based on the number of times the user has made transactions associated with a certain transaction category. The transaction points may also be based on the amount of purchase the user has made in a certain transaction category. Assigning the number of transaction points to the badge icon may modify the progress bar associated with the badge icon. For example, if the user accumulates 50 transaction points at a restaurant, the 50 transaction points may be assigned to the Food badge icon, and the progress bar associated with the Foodie badge icon may be modified to indicate the additional 50 transaction points the user has accumulated.

At block 505, the loyalty processor 104 may compare the number of transaction points to a threshold or milestone associated with the badge icon. A threshold may be a minimum number of transactions for that badge. A threshold may be a certain level of spending for that badge within a period of time (e.g., $100 of spending on restaurants and/or fast food in the past month). A threshold may be location-based spending and/or location-based transactions (e.g., $150 of spending on groceries within 20 miles of the user's hometown). Loyalty processor 104 may determine whether the user has "unlocked" the badge based on the comparison. If the user has met or exceeded that threshold for the badge, method 500 may proceed to block 506, where the loyalty processor 104 generates one or more rewards to the loyalty profile of the user based on the unlocked badge. The rewards may be similar to the rewards provided in block 406 of method 400. For instance, the reward may be based on the transaction history of the user. For example, the loyalty processor 104 may receive a history of a plurality of transactions associated with the user, and generate a reward based on the transaction history. The transaction history may include, but is not limited to, a time, a date, a location, an amount spent, a merchant type, a merchant name, a total number of visits, or a frequency of visits associated with the transactions. The reward may be a gift card, coupon, offer, discount, etc. that the user can redeem with the merchant. This reward may comprise a QR code or bar code generated by the merchant, the financial institution, and/or the loyalty processor 104. The user may present the bar code/QR code at a physical location of the merchant to redeem the reward(s). The reward may comprise a redemption code, which the user may enter at an online website hosted by the merchant. The merchant will validate the code and provide the discount/reward to the user. In this way, the loyalty profile gives the user a unified loyalty profile as opposed to having to create a loyalty profile with each merchant separately.

Figure 6:
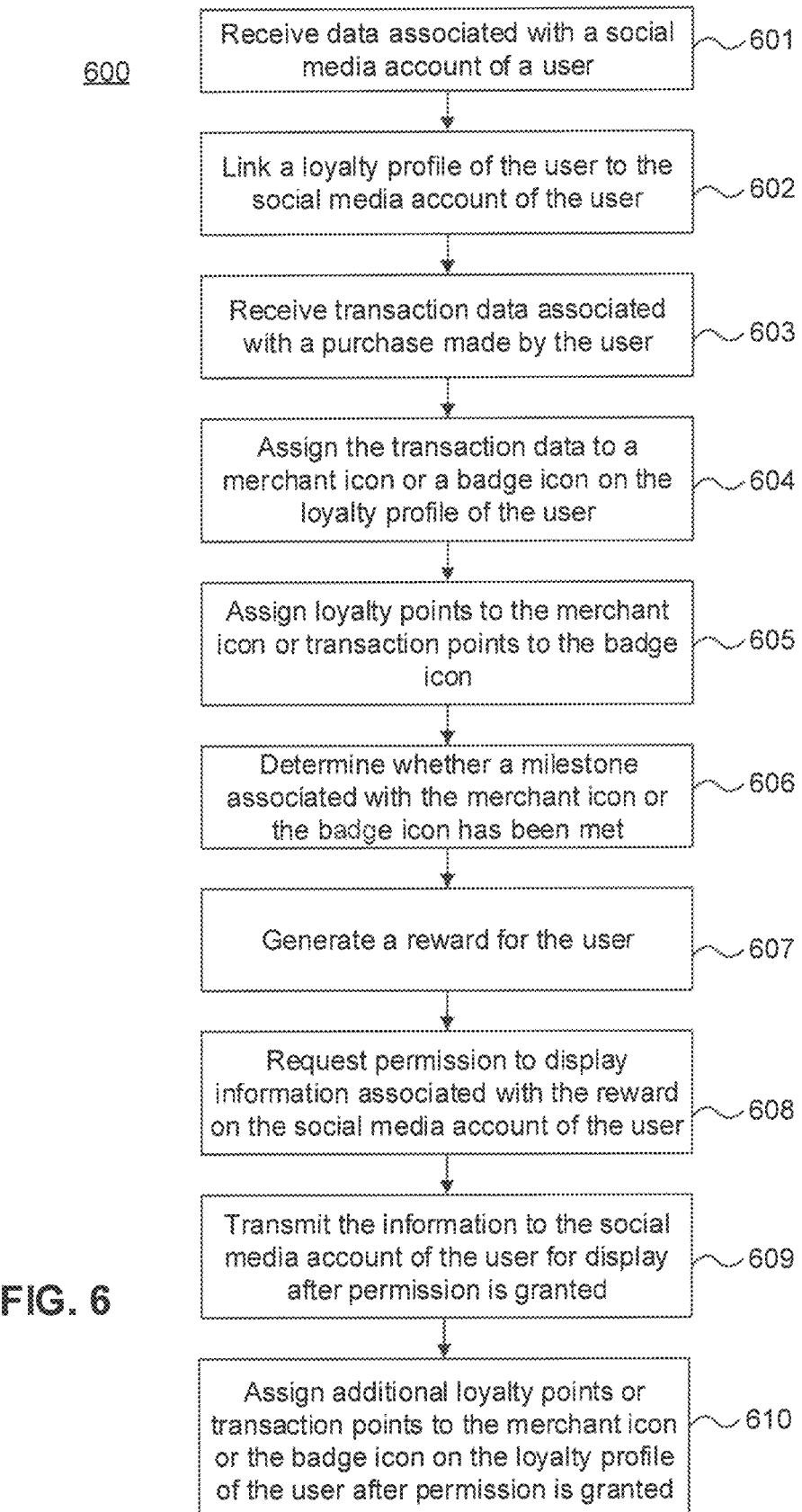
FIG. 6 shows one exemplary process of providing additional rewards to a user, in accordance with the embodiments of the present disclosure.

FIG. 6 is a flow chart illustrating a method 600 for providing enhanced rewards to a user. This exemplary method is provided by way of example. The method 600 shown in FIG. 6 can be executed or otherwise performed by one or more combinations of various systems. Each block shown in FIG. 6 represents one or more processes, methods, or subroutines in the exemplary method 600. Referring to FIG. 6, the exemplary method 600 may begin at block 601. At block 601, the loyalty processor 104 may receive encrypted data associated with a social media account of a user. For example, loyalty processor 104 may access or receive data associated with the social media account of the user from a social networking site. The data may be encrypted to filter out personally identifying information that is unnecessary to carry out the claimed methods, such as, social security numbers.

At block 602, the loyalty processor 104 may link a loyalty profile of the user to the social media account of the user. Method 600 may continue to block 603, at which the loyalty processor 104 may receive transaction data associated with a purchase made by the user. At block 604, the loyalty processor 104 may assign the transaction data received to a merchant icon or a badge icon on the loyalty profile of the user based on the merchant or the transaction category associated with the transaction data, respectively. Examples of merchant icons and badge icons are discussed above in reference to FIGS. 4 and 5. Based on the transaction data, at block 605, the loyalty processor 104 may assign loyalty points to the merchant icon or transaction points to the badge icon. At block 606, the loyalty processor 104 may compare the total number of loyalty points or the total number of transaction points to a threshold or milestone associated with the merchant icon or the badge icon, respectively. If the loyalty processor 104 determines that the user has exceeded a threshold associated with the merchant icon or the badge icon, then, at block 607, the loyalty processor 104 may generate a reward for the user.

At block 608, the loyalty processor 104 may request permission from the user to display information associated with the reward on the social media account of the user. For example, loyalty processor 104 may send a request for permission via the graphical user interface (GUI). The user may receive a pop-up notification asking if the user will grant permission to display information associated with the user's loyalty profile on the social media account of the user. Once the user grants permission, at block 609, the loyalty processor 104 may transmit information associated with the user's loyalty profile, for example information associated with the reward generated, to the social media account of the user for display. For example, the loyalty processor 104 may display loyalty data associated with the loyalty profile of the user. Loyalty data may include, but are not limited to, a number of badges unlocked, a list of badges unlocked, progress of the first user in unlocking badges, a total number of loyalty points accumulated, rewards received, rewards redeemed, or milestones met. At block 610, the loyalty processor 104 may assign or reward additional loyalty points or transaction points to the merchant icon or the badge icon on the loyalty profile of the user for granting permission.

Figure 7:
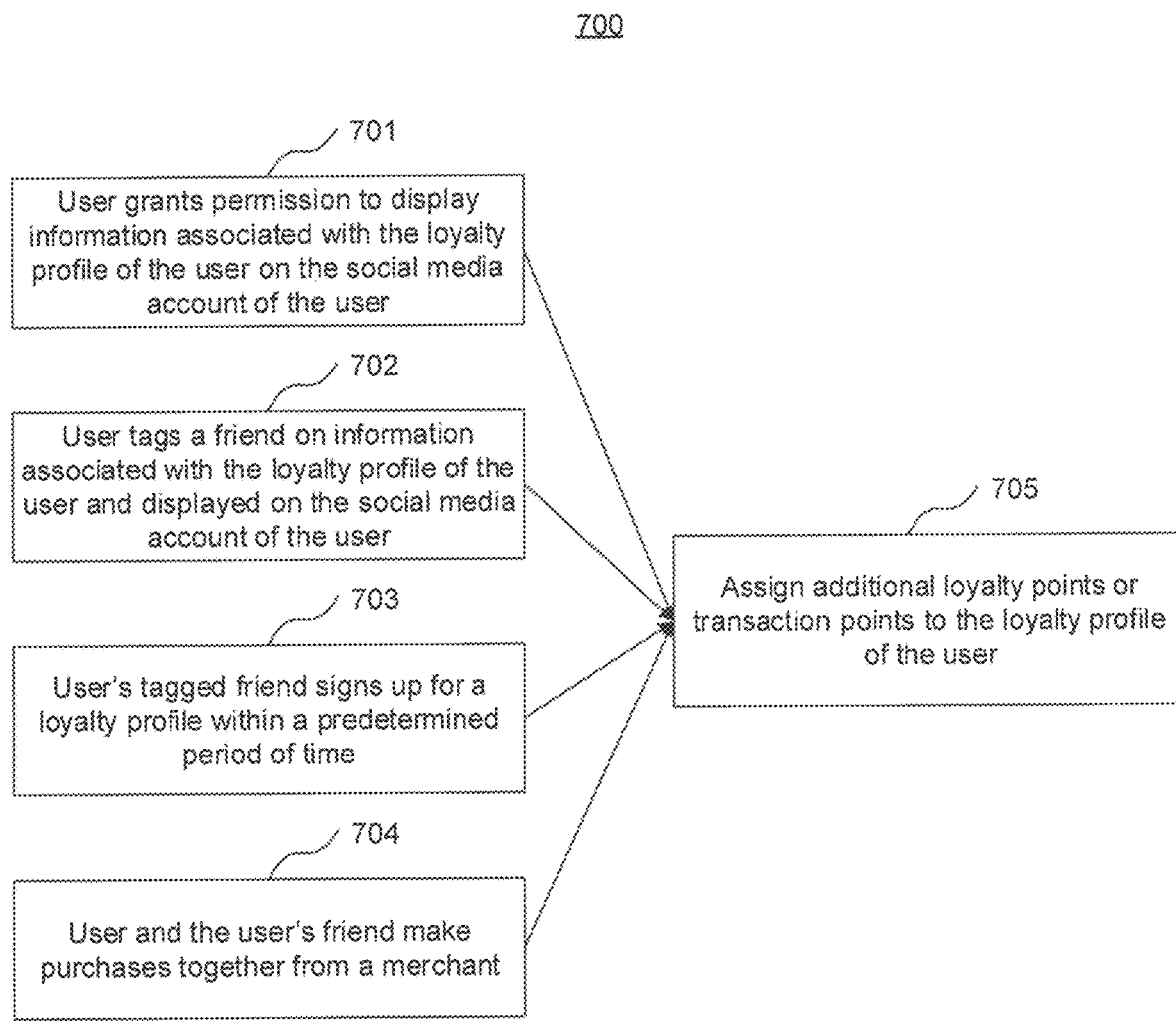
FIG. 7 shows other exemplary processes of providing additional rewards to a user, in accordance with the embodiments of the present disclosure.

FIG. 7 is a flow chart illustrating various processes for assigning additional loyalty points or transaction points to the loyalty profile of the user. This exemplary method is provided by way of example. The method 700 shown in FIG. 7 can be executed or otherwise performed by one or more combinations of various systems. Each block shown in FIG. 7 represents one or more processes, methods, or subroutines in the exemplary method 700.

At block 701, the loyalty processor 104 may determine whether the user has granted permission to display information associated with the loyalty profile of the user on the social media account of the user. For example, as discussed above, the loyalty processor 104 may request permission to the user to access the user's social media account and post information associated with the loyalty profile of the user on the social media account of the user for display. The loyalty processor 104 may determine whether the user has granted permission in response to the request.

At block 702, the loyalty processor 104 may determine whether the user has tagged a friend on information associated with the loyalty profile of the user and displayed on the social media account of the user. For example, the loyalty processor 104 may access the user's social media account and determine whether the user has tagged a friend, posted a status, liked, disliked, or performed any other operations on information associated with the loyalty profile of the user that has been displayed on the social media account of the user.

At block 703, the loyalty processor 104 may determine whether the user's tagged friend has signed up for a loyalty profile within a predetermined period of time after the user has tagged a friend on information associated with the loyalty profile of the user and displayed on the social media account of the user. For example, loyalty processor 104 may access the database and determine whether the user's tagged friend has downloaded the loyalty app and has created a loyalty profile of his or her own.

At block 704, the loyalty processor 104 may determine whether the user and the user's friend have made purchases together from a merchant. For example, the loyalty processor 104 may access the loyalty database and determine whether the user and the user's friend have made purchases together at the same merchant. Loyalty processor 104 may receive a first transaction data from the user and a second transaction data from the user's friend. Loyalty processor 104 may, then, determine whether the first transaction data is related to the second transaction data. Once the loyalty processor 104 determines that the first and second transactions are related, loyalty processor 104 may generate and provide additional loyalty points or transaction points to the loyalty profiles of the user and the user's friend. In order to determine whether the first and second transactions are related, loyalty processor 104 may determine whether the merchant associated with the first transaction of the user is the same as the merchant associated with the second transaction of the user's friend. For instance, the user and the user's friend may buy coffee or food together at a particular coffee shop. Loyalty processor 104 may access the database and determine that the user and the user's friend have both made purchases together at the coffee shop.

At block 705, the loyalty processor 104 may assign or reward additional loyalty points or transaction points to the loyalty profile of the user for tagging a friend, encouraging the user to sign up for a loyalty profile, and/or making purchases using the loyalty profile together with a friend. The user's friend may also be assigned or rewarded additional loyalty points or transaction points to his or her loyalty profile. Blocks 701 to 704 describe exemplary methods of receiving additional loyalty points or transaction points on the loyalty profile. However, the various methods of receiving additional loyalty points or transaction points are not limited in any way to the methods described above.

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system for providing rewards to a user, comprising:
at least one memory storing instructions; and
at least one processor executing the instructions to perform operations comprising:
receiving, from a social networking site, encrypted data associated with a social media account of a first user;
linking a loyalty profile, of a loyalty program application, of the first user to the social media account of the first user;
receiving transaction data, from a third party source, associated with a purchase made by the first user;
determining, based on the transaction data, a first merchant associated with the transaction data and a transaction category associated with the transaction data;
assigning, in a graphical user interface comprising a plurality of activable icons associated with the loyalty profile of the first user and the social networking site, the transaction data to a first merchant icon of the plurality of activable icons, based on the first merchant associated with the transaction data, and a badge icon of the plurality of activable icons, based on the transaction category;

assigning, in the graphical user interface and based on the transaction data, at least one of a number of loyalty points to the first merchant icon or a number of transaction points to the badge icon;

requesting, via the graphical user interface, permission from the first user to display, on the social media account of the first user, information associated with the first user;

transmitting the information to the social media account of the first user for display after the permission is granted;

determining a second merchant in a same badge category for the social networking site as the first merchant by:
  determining respective badge categories for previously visited merchants;
  determining a number of the respective badge categories corresponding to the same badge category; and
  determining to select the second merchant from the same badge category based on the number; and assigning, in the graphical user interface, additional loyalty points or transaction points to a second merchant icon, for the second merchant, after the permission is granted.

2. The system of claim 1, wherein generating the additional loyalty points or transaction points further comprises:
receiving a transaction history of a plurality of transactions associated with the user, the transaction history comprising at least one of a time, a date, a location, an amount spent, a merchant type, a merchant name, a total number of visits, or a frequency of visits associated with the transaction data; and
generating the additional loyalty points or transaction points based on the transaction history.

3. The system of claim 1, wherein the transaction data associated with the purchase comprises at least one of a credit card number used, a transaction amount, a transaction date, a transaction location, a merchant name, a merchant type, or a merchant logo associated with the purchase.

4. The system of claim 1, wherein the first merchant icon comprises a first progress bar and the badge icon comprises a second progress bar.

5. The system of claim 4, wherein at least one of the first progress bar or second progress bar is color-coded based on a rule associated with at least one of a total number of loyalty points or a total number of transaction points.

6. The system of claim 5, wherein:
at least one of the first progress bar or the second progress bar is displayed in a first color when at least one of the total number of loyalty points or the total number of transaction points reaches 25% of a first threshold or a second threshold;
at least one of the first progress bar or the second progress bar is displayed in a second color when at least one of the total number of loyalty points or the total number of transaction points reaches between 25% and 50% of the first threshold or the second threshold;
at least one of the first progress bar or the second progress bar is displayed in a third color when at least one of the total number of loyalty points or the total number of transaction points reaches between 50% and 75% of the first threshold or the second threshold; and
at least one of the first progress bar or the second progress bar is displayed in a fourth color when at least one of the total number of loyalty points or the total number of transaction points reaches between 75% and 100% of the first threshold or the second threshold.

7. The system of claim 6, wherein:
the first threshold is defined by the first merchant; and
the second threshold is defined by a financial service provider.

8. The system of claim 6, wherein:
at least one of the first merchant icon or the badge icon is color-coded when at least one of the first threshold or the second threshold is not exceeded; and
at least one of the first merchant icon or the badge icon is grayed out when at least one of the first threshold or the second threshold is exceeded.

9. The system of claim 1, wherein the graphical user interface comprises:
a second badge icon associated with a total number of transactions associated with the user; and
a third badge icon associated with a frequency of transactions associated with the user.

10. A computer-implemented method for providing rewards to a user, comprising:
receiving, from a social networking site, encrypted data associated with a social media account of a first user;
linking a loyalty profile, of a loyalty program application, of the first user to the social media account of the first user;
receiving transaction data, from a third party source, associated with a purchase made by the first user;
determining, based on the transaction data, a first merchant associated with the transaction data and a transaction category associated with the transaction data;
assigning, in a graphical user interface for the social networking site, comprising a plurality of activable icons associated with the loyalty profile of the first user, the transaction data to a first merchant icon of the plurality of activable icons, based on the first merchant associated with the transaction data, and a badge icon of the plurality of activable icons, based on the transaction category;
assigning, in the graphical user interface and based on the transaction data, at least one of a number of loyalty points to the first merchant icon or a number of transaction points to the badge icon;
requesting, via the graphical user interface, permission from the first user to display, on the social media account of the first user, information associated with the first user;
transmitting the information to the social media account of the first user for display after the permission is granted;
determining a second merchant in a same badge category as the first merchant by:
  determining respective badge categories for previously visited merchants;
  determining a number of the respective badge categories corresponding to the same badge category; and
  determining to select the second merchant from the same badge category based on the number; and
assigning, in the graphical user interface, additional loyalty points or transaction points to a second merchant icon, for the second merchant, after the permission is granted.

11. The computer-implemented method of claim 10, wherein generating the additional loyalty points or transaction points further comprises:
  receiving a transaction history of a plurality of transactions associated with the user, the transaction history comprising at least one of a time, a date, a location, an amount spent, a merchant type, a merchant name, a total number of visits, or a frequency of visits associated with the transaction data; and
  generating the additional loyalty points or transaction points based on the transaction history.

12. The computer-implemented method of claim 10, wherein the transaction data associated with the purchase comprises at least one of a credit card number used, a transaction amount, a transaction date, a transaction location, a merchant name, a merchant type, or a merchant logo associated with the purchase.

13. The computer-implemented method of claim 10, wherein the first merchant icon comprises a first progress bar and the badge icon comprises a second progress bar.

14. The computer-implemented method of claim 13, wherein at least one of the first progress bar or the second progress bar is color-coded based on a rule associated with at least one of a total number of loyalty points or a total number of transaction points.

15. The computer-implemented method of claim 14, wherein:
  at least one of the first progress bar or second progress bar is displayed in a first color when at least one of the total number of loyalty points or the total number of transaction points reaches 25% of a first threshold or a second threshold;
  at least one of the first progress bar or the second progress bar is displayed in a second color when at least one of the total number of loyalty points or the total number of transaction points reaches between 25% and 50% of the first or second threshold;
  at least one of the first progress bar or the second progress bar is displayed in a third color when at least one of the total number of loyalty points or the total number of transaction points reaches between 50% and 75% of the first or second threshold; and
  at least one of the first progress bar or the second progress bar is displayed in a fourth color when at least one of the total number of loyalty points or the total number of transaction points reaches between 75% and 100% of the first or second threshold.

16. The computer-implemented method of claim 15, wherein:
  the first threshold is defined by the first merchant; and
  the second threshold is defined by a financial service provider.

17. The computer-implemented method of claim 16, wherein:
  at least one of the first merchant icon or the badge icon is color-coded when at least one of the first threshold or the second threshold is not exceeded; and
  at least one of the first merchant icon or the badge icon is grayed out when at least one of the first threshold or the second threshold is exceeded.

18. The computer-implemented method of claim 10, wherein the graphical user interface comprises:
  a second badge icon associated with a total number of transactions associated with the user; and
  a third badge icon associated with a frequency of transactions associated with the user.

19. A non-transitory computer readable medium storing instructions that, when executed by one or more processors, cause the one or more processors to perform operations for providing rewards, the operations comprising:
  receiving, from a social networking site, encrypted data associated with a social media account of a first user;
  linking a loyalty profile, of a loyalty program application, of the first user to the social media account of the first user;
  receiving transaction data, from a third party source, associated with a purchase made by the first user;
  determining, based on the transaction data, a first merchant associated with the transaction data and a transaction category associated with the transaction data;
  assigning, in a graphical user interface, comprising a plurality of activable icons associated with the loyalty profile of the first user, the transaction data to a first merchant icon of the plurality of activable icons, based on the first merchant associated with the transaction data, and a badge icon of the plurality of activable icons, based on the transaction category;
  assigning, in the graphical user interface and based on the transaction data, at least one of a number of loyalty points to the first merchant icon or a number of transaction points to the badge icon;
  requesting, via the graphical user interface, permission from the first user to display, on the social media account of the first user, information associated with the first user;
  transmitting the information to the social media account of the first user for display after the permission is granted;
  determining a second merchant in a same category as the first merchant; and
  assigning, in the graphical user interface, additional loyalty points or transaction points to a second merchant icon, for the second merchant, after the permission is granted.

20. The non-transitory computer readable medium of claim 19, wherein generating the additional loyalty points or transaction points further comprises:
  receiving a transaction history of a plurality of transactions associated with the first user, the transaction history comprising at least one of a time, a date, a location, an amount spent, a merchant type, a merchant name, a total number of visits, or a frequency of visits associated with the transaction data; and
  generating the additional loyalty points or transaction points based on the transaction history.

* * * * *